(12) United States Patent
Nakagawa et al.

(10) Patent No.: US 7,758,761 B2
(45) Date of Patent: Jul. 20, 2010

(54) DRY ETCHING METHOD, FINE STRUCTURE FORMATION METHOD, MOLD AND MOLD FABRICATION METHOD

(75) Inventors: Hideo Nakagawa, Shiga (JP); Masaru Sasago, Osaka (JP); Tomoyasu Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 150 days.

(21) Appl. No.: 11/475,173

(22) Filed: Jun. 27, 2006

(65) Prior Publication Data

US 2007/0187359 A1    Aug. 16, 2007

(30) Foreign Application Priority Data

Feb. 13, 2006    (JP) .............................. 2006-034856

(51) Int. Cl.
    *B44C 1/22* (2006.01)
(52) U.S. Cl. .............................. 216/58; 216/63; 216/67; 216/75; 216/81
(58) Field of Classification Search .................... 216/58
    See application file for complete search history.

(56) References Cited

U.S. PATENT DOCUMENTS

| | | | | |
|---|---|---|---|---|
| 4,180,404 A * | 12/1979 | Ohmura et al. .......... 430/284.1 |
| 5,298,112 A | 3/1994 | Hayasaka et al. |
| 5,348,616 A * | 9/1994 | Hartman et al. ............... 216/48 |
| 5,772,905 A | 6/1998 | Chou |
| 5,814,238 A * | 9/1998 | Ashby et al. ................... 216/62 |
| 6,015,976 A | 1/2000 | Hatakeyama et al. |
| 6,037,263 A * | 3/2000 | Chang ......................... 438/712 |
| 6,040,248 A * | 3/2000 | Chen et al. ................... 438/725 |
| 6,383,403 B1 * | 5/2002 | Sekiya et al. .................. 216/70 |
| 6,420,095 B1 | 7/2002 | Kawamura et al. |
| 6,518,191 B2 * | 2/2003 | Nakagawa ................... 438/710 |
| 6,524,963 B1 * | 2/2003 | Zhou et al. ................... 438/714 |
| 6,890,807 B2 * | 5/2005 | Chau et al. ................... 438/199 |
| 7,371,688 B2 * | 5/2008 | Ji et al. ........................ 438/710 |
| 2003/0024902 A1 | 2/2003 | Li et al. |
| 2004/0224504 A1 * | 11/2004 | Gadgil ......................... 438/680 |

FOREIGN PATENT DOCUMENTS

| GB | EP0813233 | * 12/1997 |
| JP | 01-098229 | 4/1989 |
| JP | 07-218739 | 8/1995 |
| JP | 3152831 | 1/2001 |

OTHER PUBLICATIONS

Sigma-Aldrich: Nitro Compounds provides evidence of the chemical composition of dinitrobenzene and trinitrobenzene: http://www.sigmaaldrich.com/catalog/search/TablePage/16254342 (date unknown).*

(Continued)

*Primary Examiner*—Keith D Hendricks
*Assistant Examiner*—Patricia A George
(74) *Attorney, Agent, or Firm*—McDermott Will & Emery LLP

(57) ABSTRACT

A substance including tungsten and carbon is etched by using plasma. The plasma is generated from a mixed gas of a gas including a fluorine atom and a gas including a CN bond and a hydrogen atom.

33 Claims, 8 Drawing Sheets

OTHER PUBLICATIONS

Influence of nitrogen on carbon arc plasma and formation of fullerenes; H. Lange, and A. Huczko; Physical Chemistry Division, Laboratory of Plasma Chemistry, Department of Chemistry, Warsaw University, ul. Pasteur 1, 02-093 Warsaw, Poland Received Jan. 23, 2001; revised Mar. 6, 2001. Available online May 31, 2001.*

Wolf et al. (Silicon Processing for the VLSI Era; vol. 1; 1986; Lattice Press).*

Chou, et al. "Imprint of sub-25 nm vias and trenched in polymers" Appl. Phys. Lett. Nov. 20, 1995, vol. 67, No. 21, pp. 3114-3116.

United States Office Action issued in U.S. Appl. No. 11/659,107 dated Dec. 31, 2009.

United States Office Action issued in U.S. Appl. No. 11/659,109 dated Dec. 31, 2009.

* cited by examiner

US 7,758,761 B2

DRY ETCHING METHOD, FINE STRUCTURE FORMATION METHOD, MOLD AND MOLD FABRICATION METHOD

BACKGROUND OF THE INVENTION

The present invention relates to a microprocessing technique for a substance including tungsten (W) and carbon (C), a mold including, as a composing element, a substance including tungsten (W) and carbon (C) and a method for fabricating the mold.

Recently, in accordance with the spread of internet, there are increasing demands for an optical communication system as high bit rate communication infrastructure. In order to introduce the high bit rate communication system into general homes and make it more popular, a technique to realize a low cost of an optical circuit component included in the optical communication system is necessary.

An optical waveguide, that is, a principal composing element of the optical circuit component, can be generally fabricated by forming a desired groove pattern on a glass substrate by a lithography technique and a dry etching technique typified by semiconductor process. Since an expensive fabrication apparatus is necessary in this method, however, it is disadvantageously difficult to reduce the cost of the optical waveguide. Therefore, as described in Patent Document 1, attention is now being paid to a method for forming a desired optical waveguide or the like on a glass by pressing a mold having a desired concavo-convex structure against the surface of a softened material of glass. In this method, a desired optical waveguide can be mass produced when a mold is prepared, and hence, the optical circuit component can be inexpensively provided. However, since this method using glass should be performed at a high temperature and a high pressure, the mold needs to have heat resistance, rigidity and durability. A material satisfying this necessity is a WC alloy including tungsten (W) and carbon (C), that is, hard metals, as principal components.

A method for forming a fine pattern on the surface of a WC alloy is a metal machining method using a diamond cutting tool disclosed in Patent Document 1, but the dimension of a concavo-convex pattern cut on a mold by this machining method is several microns or more and this machining method is also restricted in processing uniformity. As a method for realizing processing of a concavo-convex pattern not only in the dimension range realized by the metal machining method using a diamond cutting tool but also with a concavo-convex dimension of 1 μm or less, a microprocessing technique employing the lithography technique and the dry etching technique is effective. Not only a fine concavo-convex pattern can be formed in this method but also processing variation is small and a mold can be fabricated at a lower cost than in the metal machining method using a diamond cutting tool.

As a dry etching technique for a WC alloy, Patent Document 2 discloses that the WC alloy can be dry etched by using $CF_4$ or $SF_6$.

Now, the conventional dry etching method will be described with reference to FIGS. 7A and 7B. As shown in FIG. 7A, a reaction chamber 101 in which a reduced pressure can be kept is provided with a gas inlet 102 and a gas outlet 103. Also, a plasma generator 104 for changing a gas supplied through the gas inlet 102 into plasma is provided in an upper portion of the reaction chamber 101. Furthermore, an electrode 106 on which a target material, specifically, a WC alloy substrate or a substrate having a WC alloy in its surface portion (hereinafter both referred to as a WC substrate 107), is placed is provided on an insulator 105 in a lower portion of the reaction chamber 101. An RF (radio frequency) power source 108 for applying a bias voltage to the electrode 106 is provided outside the reaction chamber 101.

Next, the operation of the etching system shown in FIG. 7A will be described by exemplifying the case where $CF_4$ is used as an etching gas. As shown in FIG. 7A, $CF_4$ is introduced through the gas inlet 102 into the reaction chamber 101, and plasma 150 of the $CF_4$ is generated by the plasma generator 104 and at the same time, RF bias is applied to the WC substrate 107 by the RF power source 108. As a result, radicals 109 of C, F or $CF_n$ (wherein n=1 though 4) and their ions 110 are produced in the plasma 150. At this point, in the plasma 150 used for the dry etching, the proportions in the number of atoms or molecules produced by the plasma 150 are generally in the order of $F > CF_n \gg C$. The radicals 109 are isotropically diffused to reach the WC substrate 107, but the ions 110 are accelerated between the plasma 150 and the WC substrate 107 and hence enter the WC substrate 107 substantially vertically. In particular, in the case where a $F^+$ ion or a $CF^{n+}$ ion including a F atom enters the WC substrate 107, a bond between W and C is cut and W is released in the form of $WF_x$ (wherein x=1 through 6). On the other hand, C is re-released in the form of $CF_y$ (wherein y=1 through 4).

The etching reaction caused on the surface of the WC substrate will now be described in more detail with reference to FIG. 7B. As shown in FIG. 7B, a resist pattern 112 is formed on a WC substrate 111. When the WC substrate 111 is etched with ions 113a and 113b of $F^+$ or $CF^+$ by using the resist pattern 112 as a mask, the W included in the WC substrate 111 is released in the form of $WF_x$ (wherein x=1 through 6) 114. At this point, the side face of a pattern of the WC substrate 111 obtained through the etching is in a bowing shape for the following reason:

In the etching of the WC substrate 111, most ions enter the WC substrate 111 substantially vertically like the ion 113a, but since ions basically have energy spread (an ion energy angular distribution), some ions enter the WC substrate 111 obliquely like the ion 113b. Accordingly, the anisotropic (vertical) etching of the WC substrate 111 by using the resist pattern 112 as the etching mask is realized by the ion 113a vertically entering the WC substrate 111. However, due to the impact caused by the ion 113b obliquely entering the WC substrate 111, the side face of the pattern of the WC substrate 111 is etched, resulting in the bowing shape as shown in FIG. 7B.

Next, a conventional fine structure formation method for a WC alloy and a mold fabrication method by employing the same will be described with reference to FIGS. 8A through 8D.

As shown in FIG. 8A, a WC alloy substrate 121 is prepared, and a resist pattern 122 is formed on the WC alloy substrate 121 as shown in FIG. 8B. The resist pattern 122 is generally formed by the lithography technique. Next, as shown in FIG. 8C, a pattern is transferred onto the WC alloy substrate 121 by using the resist pattern 122 as a mask. At this point, the pattern transfer is performed by the dry etching technique.

When the aforementioned conventional dry etching technique is employed, since ions 123 entering the WC alloy substrate 121 from plasma have the energy spread, there are not only a component A vertically entering the surface of the WC alloy substrate 121 but also components obliquely entering the surface at an angle, namely, obliquely entering components B and C. Therefore, since the side face of a pattern of the WC alloy substrate 121 is etched by such obliquely entering ions, the etched cross-section is in what is called a bowing shape as shown in FIG. 8C.

Then, the resist pattern 122 is removed through ashing, and the resultant substrate is cleaned. Thus, a mold made of the WC alloy substrate 121 having a fine concavo-convex structure in its surface and inside portions is obtained as shown in FIG. 8D.

A conventional processing technique by using a mold is a nano-imprint method such as nano-imprint lithography proposed by S. Y. Chou et al. (see, for example, Patent Document 3 and Non-patent Document 1). In the nano-imprint method, a mold is pressed against a resist thin film formed on a semiconductor wafer for forming a fine resist pattern, and this method is currently under development for forming a fine pattern of a nano order as the minimum dimension. In a fine structure portion of a conventional mold for use in the nano-imprint method, a $SiO_2$ film or a $Si_3N_4$ film that can be easily processed is used.

Patent Document 1: Japanese Patent No. 3152831

Patent Document 2: Japanese Laid-Open Patent Publication No. 1-98229

Patent Document 3: U.S. Pat. No. 5,772,905

Non-patent Document 1: Stephen Y. Chou, et al., Appl. Phys. Lett., Vol. 67, 1995, pp. 3114-3116

SUMMARY OF THE INVENTION

In the conventional dry etching method using $CF_4$ or $SF_6$, however, not only the bottom of a pattern but also the side face of the pattern is etched so that the side face is formed in a bowing shape as described above, and hence, a vertical etching shape cannot be attained and high performance processing cannot be performed. Furthermore, the processing by the conventional dry etching method has a problem that a highly precise fine structure cannot be formed on and inside a WC alloy. As a result, there is a serious problem that a WC alloy mold with a highly precise fine structure cannot be fabricated.

In consideration of the aforementioned conventional disadvantage and problem, an object of the invention is providing a dry etching method for a WC alloy that can realize a vertical etching shape by preventing the side face of a pattern from being etched. Another object of the invention is providing a fine structure formation method for forming a highly precise fine structure in a vertical shape on and inside a WC alloy. Still another object of the invention is providing a WC alloy mold with a highly precise fine structure and a method for fabricating the same.

In order to achieve the objects, the dry etching method of this invention includes the step of performing etching on a substance including tungsten and carbon by using plasma generated from a mixed gas of a gas including a fluorine atom and a gas including a CN bond and a hydrogen atom.

In the dry etching method of this invention, it is possible to perform etching processing for realizing, on and within the substance including tungsten and carbon, a highly precise vertical shape or a highly precise downward tapered shape free from a bowing shape. In addition, it is possible to realize high-aspect ratio etching processing. Examples of the substance including tungsten and carbon are a WC alloy and a substance including W and C as principal components (in which a total composition ratio of W and C is 50 at % or more).

In the dry etching method of the invention, the mixed gas may be replaced with a gas including a fluorine atom, a CN bond and a hydrogen atom (such as 1-fluoro-2,4-dinitrobenzene ($C_6H_3F(NO_2)_2$) or 2-fluoro-1,3,5-trinitrobenzene ($C_6H_2F(NO_2)_3$)).

In the dry etching method of the invention, the gas including a fluorine atom preferably includes a fluorine molecule, fluorocarbon, fluorohydrocarbon or a mixture of two or more thereof. Thus, fluorine necessary for etching the tungsten (W) included in the substance including W and C can be efficiently produced through plasma discharge.

In the dry etching method of the invention, the gas including a CN bond and a hydrogen atom preferably includes alkylamine, dialkylamine, trialkylamine or a mixture of two or more thereof. Thus, since these gases have comparatively small molecules, they can be easily dissociated through the plasma, so as to efficiently supply hydrogen and a $CNH_s$ molecule (wherein s=0, 1, 2, 3, 4 or 5). As a result, a sidewall protecting film can be efficiently formed even in etching for forming a shape with a high aspect ratio.

In the dry etching method of the invention, the mixed gas preferably further includes a hydrogen molecule. Thus, the amount of hydrogen produced through the plasma discharge is increased, and hence, the etching efficiency for the carbon (C) included in the substance including W and C can be increased.

In the dry etching method of the invention, wherein the mixed gas preferably further includes a gas including an oxygen atom. Thus, oxygen can be efficiently supplied, and hence, an excessively deposited film can be appropriately removed.

In the dry etching method of the invention, the mixed gas preferably further includes an inert gas. Thus, the plasma discharge can be further stabilized by an inert gas effect, and hence, what is called a process window (i.e., an applicable range of process conditions) can be easily increased.

In the dry etching method of the invention, the mixed gas preferably further includes a gas including a nitrogen atom. Thus, the power to remove the C included in the substance including W and C is increased so as to increase the etching rate. It is noted that the gas including a fluorine atom and the gas including a nitrogen atom may be replaced with a gas including a fluorine atom and a nitrogen atom. Also, the gas including a nitrogen atom preferably includes a nitrogen molecule, an ammonia molecule or a mixture thereof. Thus, since these gases have a small molecular weight, a nitrogen atom ion can be efficiently produced, resulting in attaining a large effect to increase the etching rate. Also, the cross-sectional shape of a fine structure can be easily controlled in a range from a vertical shape to a downward tapered shape.

In the dry etching method of the invention, the mixed gas preferably further includes a hydrocarbon molecule. Thus, the formation of the sidewall protecting film is accelerated and the effect to protect a resist is increased. Also, the hydrocarbon molecule is preferably a saturated hydrocarbon molecule. Thus, since a saturated hydrocarbon molecule does not include a double bond, the hydrocarbon molecule can be easily decomposed through the plasma discharge, resulting in efficiently producing $CH_r$ (wherein r=1 through 3) as a decomposition product. Accordingly, a protecting film for the side face of the pattern can be efficiently formed from the $CH_r$ during the etching.

In the dry etching method of the invention, the mixed gas preferably further includes at least one of a gas including a chlorine atom, a gas including a bromine atom and a gas including an iodine atom. Thus, the effect to protect the side face can be increased even in a lower portion of an etched portion (a recess) by the effect of chlorine, bromine or iodine, and therefore, not only vertical shape processing but also downward tapered shape processing can be easily realized in the etching for a fine structure with a high aspect ratio.

The fine structure formation method of this invention includes the steps of forming a mask pattern on a substance including tungsten and carbon; and performing, with the mask pattern used, dry etching on the substance by using plasma generated from a mixed gas of a gas including a fluorine atom and a gas including a CN bond and a hydrogen atom.

In the fine structure formation method of this invention, a fine structure with a high aspect ratio can be formed, on and inside the substance including tungsten and carbon, in a highly precise vertical shape or a highly precise downward tapered shape free from a bowing shape.

In the fine structure formation method of the invention, the mixed gas may be replaced with a gas including a fluorine atom, a CN bond and a hydrogen atom (such as 1-fluoro-2,4-dinitrobenzene ($C_6H_3F(NO_2)_2$) or 2-fluoro-1,3,5-trinitrobenzene ($C_6H_2F(NO_2)_3$)).

In the fine structure formation method of the invention, the gas including a fluorine atom preferably includes a fluorine molecule, fluorocarbon, fluorohydrocarbon or a mixture of two or more thereof. Thus, fluorine necessary for etching the tungsten (W) included in the substance including W and C can be efficiently produced through plasma discharge, and therefore, rapid microprocessing can be realized.

In the fine structure formation method of the invention, the gas including a CN bond and a hydrogen atom preferably includes alkylamine, dialkylamine, trialkylamine or a mixture of two or more thereof. Thus, hydrogen and a $CNH_s$ molecule (wherein s=0, 1, 2, 3, 4 or 5) can be efficiently supplied into a fine structure (a recess) during the etching, and hence, a sidewall protecting film can be efficiently formed. Accordingly, vertical shape microprocessing or downward tapered shape microprocessing can be easily realized even in etching for forming a shape with a high aspect ratio.

In the fine structure formation method of the invention, the mixed gas preferably further includes a hydrogen molecule. Thus, since the etching efficiency for the carbon included in the substance including W and C is increased, further rapid microprocessing can be realized.

In the fine structure formation method of the invention, the mixed gas preferably further includes a gas including an oxygen atom. Thus, the carbon included in the substance including W and C and a deposition such as an excessive portion of the sidewall protecting film can be appropriately removed and the etching rate can be increased. Therefore, further rapid microprocessing can be realized.

In the fine structure formation method of the invention, the mixed gas preferably further includes an inert gas. Thus, the plasma discharge can be further stabilized by the inert gas effect, and hence, what is called a process window can be easily increased in the microprocessing.

In the fine structure formation method of the invention, the mixed gas preferably further includes a gas including a nitrogen atom. Thus, the carbon included in the substance including W and C can be further efficiently removed through the etching by a nitrogen ion produced in the plasma, and hence, rapid microprocessing can be realized. Also, the cross-sectional shape of the fine structure can be easily controlled in a range from a vertical shape to a downward tapered shape. It is noted that the gas including a fluorine atom and the gas including a nitrogen atom may be replaced with a gas including a fluorine atom and a nitrogen atom. Also, the gas including a nitrogen atom preferably includes a nitrogen molecule, an ammonia molecule or a mixture thereof. Thus, since these gases have a small molecular weight, a nitrogen atom ion can be efficiently produced, resulting in rapidly forming a fine structure.

In the fine structure formation method of the invention, the mixed gas preferably further includes a hydrocarbon molecule. Thus, the formation of the sidewall protecting film is accelerated not only by a $CNH_s$ molecule but also $CH_r$ (where r=1 through 3) during the etching, and hence, the vertical processing or the downward tapered processing of the fine structure can be easily realized. Moreover, the effect to protect a resist is largely increased. Also, the hydrocarbon molecule is preferably a saturated hydrocarbon molecule. Thus, since a saturated hydrocarbon molecule does not include a double bond, the hydrocarbon molecule can be easily decomposed through the plasma discharge, resulting in efficiently producing $CH_r$ (wherein r=1 through 3) as a decomposition product. Accordingly, a protecting film for the side face of the pattern corresponding to an upper portion of the etched portion can be efficiently formed from the $CH_r$ during the etching. As a result, the etching shape can be more easily controlled to be tapered.

In the fine structure formation method of the invention, the mixed gas preferably further includes at least one of a gas including a chlorine atom, a gas including a bromine atom and a gas including an iodine atom. Thus, the effect to protect the side face can be increased even in a lower portion of an etched portion (a recess) by the effect of chlorine, bromine or iodine, and therefore, vertical shape processing or downward tapered shape processing can be easily realized in the etching for a fine structure with a high aspect ratio.

The mold fabrication method of this invention includes the step of processing a substance including tungsten and carbon into a mold by using plasma generated from a mixed gas of a gas including a fluorine atom and a gas including a CN bond and a hydrogen atom.

In the mold fabrication method of the invention, since the dry etching method of this invention is employed, a mold made of a substance including W and C and having a fine concavo-convex pattern with a vertical or downward tapered cross-section can be fabricated. Also, a mold having a fine structure with a high aspect ratio can be fabricated.

In the mold fabrication method of the invention, the mixed gas may be replaced with a gas including a fluorine atom, a CN bond and a hydrogen atom (such as 1-fluoro-2,4-dinitrobenzene ($C_6H_3F(NO_2)_2$) or 2-fluoro-1,3,5-trinitrobenzene ($C_6H_2F(NO_2)_3$)).

In the mold fabrication method of the invention, the gas including a fluorine atom preferably includes a fluorine molecule, fluorocarbon, fluorohydrocarbon or a mixture of two or more thereof. Thus, fluorine necessary for etching the tungsten (W) included in the substance including W and C can be efficiently produced through plasma discharge, and therefore, a mold having a highly precise fine concavo-convex pattern can be inexpensively and rapidly fabricated.

In the mold fabrication method of the invention, the gas including a CN bond and a hydrogen atom preferably includes alkylamine, dialkylamine, trialkylamine or a mixture of two or more thereof. Thus, since hydrogen and a $CNH_s$ molecule (wherein s=0, 1, 2, 3, 4 or 5) can be efficiently supplied into a fine structure (a recess) during the etching, a sidewall protecting film can be efficiently formed. As a result, a vertical cross-sectional shape or a downward tapered cross-sectional shape can be easily realized in a mold having a shape with a high aspect ratio.

In the mold fabrication method of the invention, the mixed gas preferably further includes a hydrogen molecule. Thus, the etching efficiency for the carbon included in the substance including W and C can be increased, and hence, a mold having a fine concavo-convex pattern with a vertical or downward tapered cross-section can be rapidly fabricated.

In the mold fabrication method of the invention, the mixed gas preferably further includes a gas including an oxygen atom. Thus, the carbon included in the substance including W and C and a deposition such as an excessive portion of the sidewall protecting film can be appropriately removed and the etching rate can be increased. Therefore, a mold having a fine concavo-convex pattern with a vertical or downward tapered cross-section can be further rapidly fabricated.

In the mold fabrication method of the invention, the mixed gas preferably further includes an inert gas. Thus, the plasma discharge can be further stabilized by the inert gas effect, and hence, what is called a process window can be easily increased. Accordingly, a mold having a fine concavo-convex pattern with a vertical or downward tapered cross-section can be stably fabricated.

In the mold fabrication method of the invention, the mixed gas preferably further includes a gas including a nitrogen atom. Thus, the carbon included in the substance including W and C can be efficiently removed through the etching by a nitrogen ion produced in the plasma, and the cross-sectional shape of the fine structure can be easily controlled in a range from a vertical shape to a downward tapered shape. Accordingly, a mold having a fine concavo-convex pattern with a vertical or downward tapered cross-section can be rapidly fabricated with high controllability. It is noted that the gas including a fluorine atom and the gas including a nitrogen atom may be replaced with a gas including a fluorine atom and a nitrogen atom. Also, the gas including a nitrogen atom preferably includes a nitrogen molecule, an ammonia molecule or a mixture thereof. Thus, since these gases have a small molecular weight, a nitrogen atom ion can be efficiently produced. As a result, a mold having a fine concavo-convex pattern with an arbitrary cross-sectional shape ranging from a vertical shape to a downward tapered shape can be rapidly fabricated.

In the mold fabrication method of the invention, the mixed gas preferably further includes a hydrocarbon molecule. Thus, the formation of the sidewall protecting film is accelerated by $CH_r$ (where r=1 through 3) produced in the plasma, and the effect to protect a resist is increased. Therefore, a mold having a fine concavo-convex pattern with a vertical or a downward tapered cross-section can be more easily fabricated. Also, the hydrocarbon molecule is preferably a saturated hydrocarbon molecule. Thus, since a saturated hydrocarbon molecule does not include a double bond, the hydrocarbon molecule can be easily decomposed through the plasma discharge, resulting in efficiently producing $CH_r$ (wherein r=1 through 3) as a decomposition product. Accordingly, a protecting film for the side face of the pattern corresponding to the upper portion of the etched portion can be efficiently formed from the $CH_r$ during the etching. As a result, a mold having a fine concavo-convex pattern with a vertical or downward tapered cross-section can be more easily fabricated.

In the mold fabrication method of the invention, the mixed gas preferably further includes at least one of a gas including a chlorine atom, a gas including a bromine atom and a gas including an iodine atom. Thus, the effect to protect the side face can be increased even in a lower portion of an etched portion (a recess) by the effect of chlorine, bromine or iodine, and therefore, a mold having a fine structure with a high aspect ratio and with a vertical or downward tapered cross-section can be easily fabricated.

The mold of this invention is fabricated by processing a substance including tungsten and carbon by using plasma generated from a mixed gas of a gas including a fluorine atom and a gas including a CN bond and a hydrogen atom.

Since the mold of this invention is fabricated by employing the dry etching method of this invention, a mold made of a substance including W and C and having a fine concavo-convex pattern with a vertical or downward tapered cross-section can be provided.

In the mold of the invention, the mixed gas may be replaced with a gas including a fluorine atom, a CN bond and a hydrogen atom (such as 1-fluoro-2,4-dinitrobenzene ($C_6H_3F(NO_2)_2$) or 2-fluoro-1,3,5-trinitrobenzene ($C_6H_2F(NO_2)_3$)).

In the mold of the invention, the gas including a fluorine atom preferably includes a fluorine molecule, fluorocarbon, fluorohydrocarbon or a mixture of two or more thereof. Thus, a fine structure can be rapidly formed, and hence, a mold having a highly precise fine concavo-convex pattern can be inexpensively provided.

In the mold of the invention, the gas including a CN bond and a hydrogen atom preferably includes alkylamine, dialkylamine, trialkylamine or a mixture of two or more thereof. Thus, since hydrogen and a $CNH_s$ molecule (wherein s=0, 1, 2, 3, 4 or 5) can be efficiently supplied into a fine structure (a recess) during the etching, a sidewall protecting film can be efficiently formed. As a result, a mold having a fine structure with a vertical cross-sectional shape or a downward tapered cross-sectional shape and a high aspect ratio can be provided.

In the mold of the invention, the mixed gas preferably further includes a hydrogen molecule. Thus, the etching efficiency for the carbon included in the substance including W and C can be increased, and hence, a mold having a fine concavo-convex pattern with a vertical or downward tapered cross-section can be rapidly provided.

In the mold of the invention, the mixed gas preferably further includes a gas including an oxygen atom. Thus, the carbon included in the substance including W and C and a deposition such as an excessive portion of the sidewall protecting film can be appropriately removed and the etching rate can be increased. Therefore, a mold having a fine concavo-convex pattern with a vertical or downward tapered cross-section can be further rapidly provided.

In the mold of the invention, the mixed gas preferably further includes an inert gas. Thus, the plasma discharge can be further stabilized by the inert gas effect, and hence, what is called a process window can be easily increased. Accordingly, a mold having a fine concavo-convex pattern with a vertical or downward tapered cross-section can be stably provided.

In the mold of the invention, the mixed gas preferably further includes a gas including a nitrogen atom. Thus, the etching can be more rapidly performed and the cross-sectional shape of the fine structure can be easily controlled in a range from a vertical shape to a downward tapered shape. Accordingly, an inexpensive mold having a fine concavo-convex pattern with a vertical or downward tapered cross-section can be provided. It is noted that the gas including a fluorine atom and the gas including a nitrogen atom may be replaced with a gas including a fluorine atom and a nitrogen atom. Also, the gas including a nitrogen atom preferably includes a nitrogen molecule, an ammonia molecule or a mixture thereof. Thus, since these gases have a small molecular weight, a nitrogen atom ion can be efficiently produced. As a result, a mold having a fine concavo-convex pattern with an arbitrary cross-sectional shape ranging from a vertical shape to a downward tapered shape can be inexpensively provided.

In the mold of the invention, the mixed gas preferably further includes a hydrocarbon molecule. Thus, the sidewall protecting film can be efficiently formed by $CH_r$ (where r=1 through 3) produced in the plasma, and therefore, a mold having a fine concavo-convex pattern with a vertical or a downward tapered cross-section can be more easily provided. Also, the hydrocarbon molecule is preferably a saturated hydrocarbon molecule. Thus, since a saturated hydrocarbon molecule does not include a double bond, the hydrocarbon molecule can be easily decomposed through the plasma discharge, resulting in efficiently producing $CH_r$ (wherein r=1 through 3) as a decomposition product. Accordingly, a protecting film for the side face of the pattern can be efficiently formed from the $CH_r$ during the etching. As a result, a mold having a fine concavo-convex pattern with a vertical or downward tapered cross-section can be more easily provided.

In the mold of the invention, the mixed gas preferably further includes at least one of a gas including a chlorine atom, a gas including a bromine atom and a gas including an iodine atom. Thus, the effect to protect the side face of the etched portion can be increased by the effect of chlorine, bromine or iodine, and therefore, a mold having a fine structure with a high aspect ratio and with a vertical or downward tapered cross-section can be easily provided.

The effects of the invention are summarized as follows:

In the dry etching method of this invention, since plasma generated from a mixed gas of a gas including a fluorine atom and a gas including a CN bond and a hydrogen atom is used for etching a substance including the tungsten (W) and carbon (C), the tungsten is removed through the etching by an ion including a fluorine atom in the form of $WF_x$ (wherein x=1 through 6). Simultaneously, since a protecting film is formed during the etching on the side face of a pattern by a $CNH_s$ (wherein s=0, 1, 2, 3, 4 or 5) molecule produced from the gas including a CN bond and a hydrogen atom, the side face of the pattern is prevented from being etched by impact of an ion entering the side face, and hence, a vertical etched cross-section can be realized. Furthermore, the carbon is simultaneously efficiently removed in the form of CN, $C_2N_2$ or HCN by an ion including a nitrogen atom supplied from the plasma, and therefore, the etching efficiency for the tungsten by a fluorine ion can be further improved. As a result, a vertical cross-sectional shape or a downward tapered cross-sectional shape can be realized in high-aspect ratio etching processing for the substance including W and C.

Moreover, in the dry etching of this invention, when the mixed gas further includes a gas including a nitrogen atom, nitrogen can be independently supplied, and hence, the carbon can be efficiently removed through the etching in the form of CN, $C_2N_2$ or HCN by an ion including a nitrogen atom. As a result, the etching for the W by the ion including a fluorine atom and the etching for the C by the ion including a nitrogen atom are simultaneously proceeded, resulting in realizing rapid and highly efficient etching through the synergistic effect. Also, when the gas including a nitrogen atom is additionally used, the quantity of sidewall protecting film formed by the gas including a CN bond and a hydrogen atom can be easily controlled, and hence, the cross-sectional shape of a fine structure can be easily controlled in a range from a vertical shape to a downward tapered shape. As a result, the substance including W and C can be rapidly etched into a vertical or downward tapered shape with a high aspect ratio. In other words, the etched shape can be easily controlled in the range from a vertical shape to a downward tapered shape.

Also, in the dry etching method of this invention, when the mixed gas further includes a hydrocarbon molecule, $CH_r$ (wherein r=1 through 3) can be efficiently produced as a decomposition product, and therefore, a protecting film can be efficiently formed in an upper portion of the side face of the etched portion during the etching and the effect to protect a resist can be increased. As a result, vertical shape etching or downward tapered shape etching can be more easily realized in the high-aspect ratio etching of the substance including W and C. Simultaneously, the etching property against the resist (etch selectivity between the substance to be etched and the resist) can be largely improved.

Moreover, in the dry etching method of this invention, when the mixed gas further includes any of a gas including a chlorine atom, a gas including a bromine atom and a gas including an iodine atom, $WCl_x$ (wherein x=1 through 6), or $WBr_x$ (wherein x=1 through 6) or $WI_x$ (wherein x=1 through 6) with lower volatility is produced from the etched portion. Therefore, as compared with the case where none of these gases is additionally used, a sidewall protecting film with a larger thickness can be easily formed. Furthermore, the side face protecting effect on the bottom of the etched portion can be increased. Accordingly, not only the vertical shape etching but also the downward tapered shape etching can be easily realized in the processing of a fine structure with a high aspect ratio.

In the fine structure formation method of this invention, a fine concavo-convex pattern with a vertical cross-section or a downward tapered cross-section can be formed on and within a substance including W and C.

In the mold fabrication method of this invention, a mold made of a substance including W and C and having a fine concavo-convex pattern with a vertical cross-section or a downward tapered cross-section can be fabricated.

In the mold of this invention, a mold made of a substance including W and C and having a fine concavo-convex pattern with a vertical cross-section or a downward tapered cross-section can be realized.

In any of the dry etching method, the fine structure formation method, the mold fabrication method and the mold of this invention, even when the substance including tungsten and carbon further includes nitrogen (N), the same effects as described above can be attained. In other words, when the invention is applied to a WCN alloy, a WNC alloy or the like, the same effects can be attained.

As described so far, the dry etching method of this invention is useful for highly precise microprocessing of a substance including W and C such as a WC alloy. Also, the fine structure formation method of this invention is very useful for precisely forming a fine pattern in a substance including W and C such as a WC alloy. Specifically, as a technique to remarkably increase the preciseness and easiness of processing of a hard metal of a WC alloy or the like, the dry etching method and the fine structure formation method of this invention can pave the way for the use of a WC alloy or the like in the field of MEMS (micro-electro-mechanical systems).

The mold fabrication method of this invention is indispensable for fabricating a mold having a highly precise fine concavo-convex pattern by using, as a mold base material, a substance including tungsten and carbon such as a WC alloy. Also, since the mold of this invention has a structure in which a highly precise fine concavo-convex pattern is provided on a hard metal of a WC alloy or the like, it can be used not only for fabrication of an optical circuit component or for nano-imprint but also as a highly durable mold having a highly precise fine concavo-convex pattern applicable in any field.

DETAILED DESCRIPTION OF THE INVENTION

Embodiment 1

A dry etching method according to Embodiment 1 of the invention will now be described with reference to the accompanying drawings.

Figure 1A:
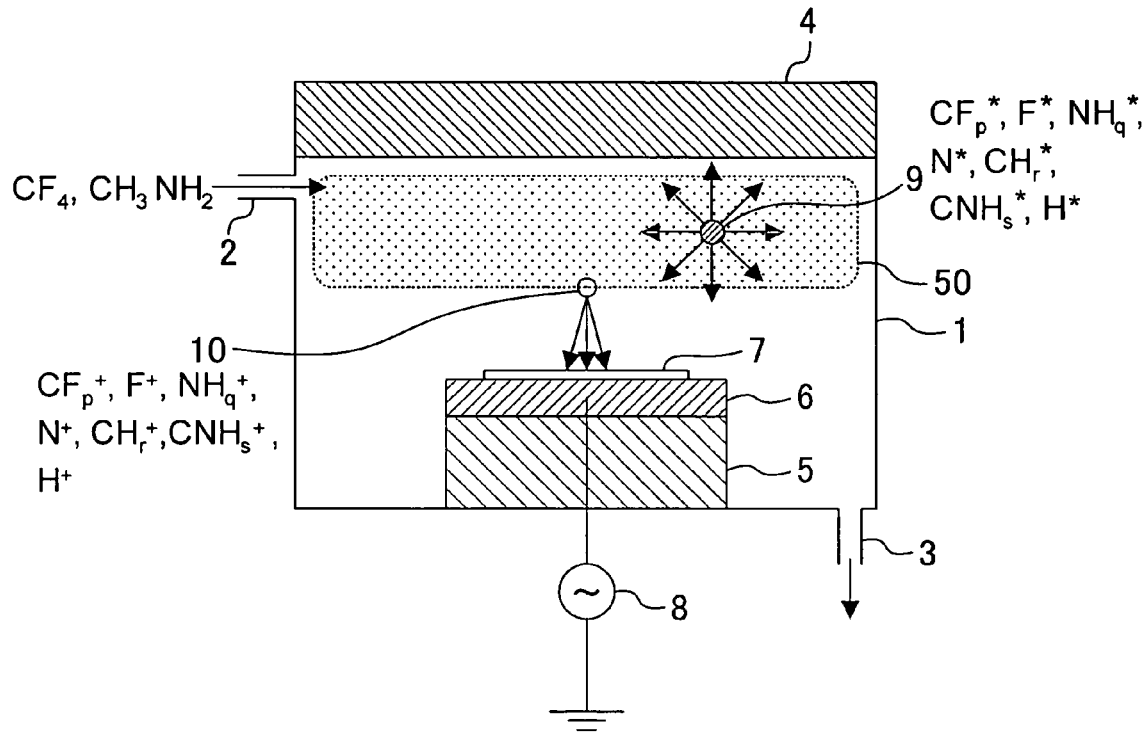
FIGS. 1A and 1B are explanatory diagrams of a dry etching method according to Embodiment 1 of the invention.
Figure 1B:
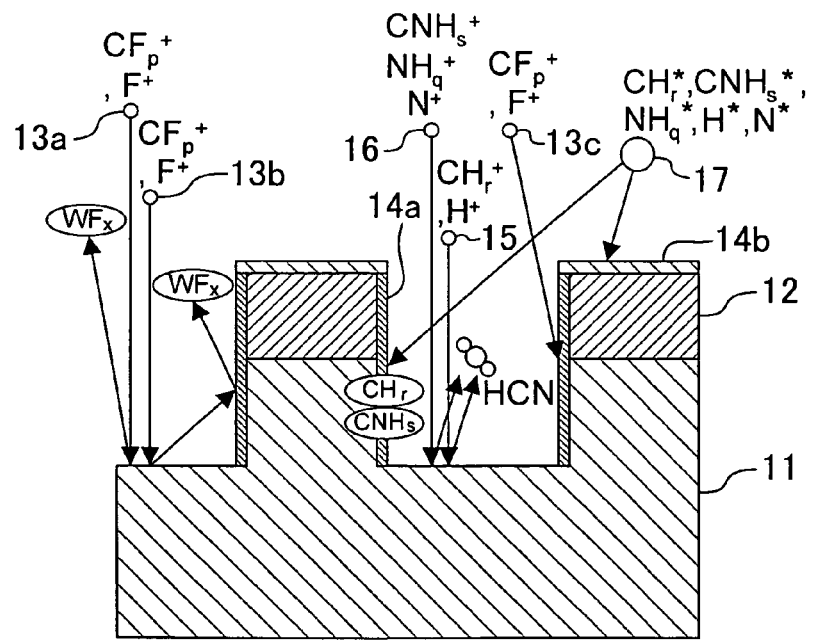

FIGS. 1A and 1B are explanatory diagrams of the dry etching method of Embodiment 1 of the invention. As shown in FIG. 1A, a reaction chamber 1 in which a reduced pressure can be kept is provided with a gas inlet 2 and a gas outlet 3. Also, a plasma generator 4 for changing a gas supplied through the gas inlet 2 into plasma is provided in an upper portion of the reaction chamber 1. Furthermore, an electrode 6 on which a target substance including tungsten and carbon, specifically, a WC alloy substrate or a substrate having a WC alloy in its surface portion (hereinafter both referred to as a WC substrate 7), is placed is provided on an insulator 5 in a lower portion of the reaction chamber 1. An RF (radio frequency) power source 8 for applying a bias voltage to the electrode 6 is provided outside the reaction chamber 1.

Next, the operation of the etching system shown in FIG. 1A, namely, the dry etching method of this embodiment, will be described by exemplifying the case where a mixed gas of a gas including a fluorine atom and a gas including a CN bond and a hydrogen atom is used as an etching gas. As shown in FIG. 1A, the mixed gas of the gas including a fluorine atom (such as $CF_4$) and the gas including a CN bond and a hydrogen atom (such as $CH_3NH_2$) is introduced through the gas inlet 2 into the reaction chamber 1, and plasma 50 of the mixed gas is generated by the plasma generator 4 and at the same time, RF bias is applied to the WC substrate 7 by the RF power source 8. As a result, radicals 9 of $CF_p{}^*$ (wherein p=1, 2 or 3), $F^*$, $CH_r{}^*$ (wherein r=1, 2 or 3), $CNH_s{}^*$ (wherein s=0, 1, 2, 3, 4 or 5), $NH_q{}^*$ (wherein q=1 or 2), $H^*$ and $N^*$ and ions 10 of $CF_p{}^+$ (wherein p=1, 2 or 3), $F^+$, $NH_q{}^+$ (wherein q=1 or 2), $N^+$, $CH_r{}^+$ (wherein r=1, 2 or 3), $CNH_s{}^+$ (wherein s=0, 1, 2, 3, 4 or 5) and $H^+$ are produced in the plasma 50 generated from the mixed gas. It is noted that a mark "*" is herein used for expressing a radical including an excited atom.

The radicals 9 are isotropically diffused to reach the WC substrate 7, but the ions 10 are accelerated between the plasma 50 and the WC substrate 7 and hence enter the WC substrate 7 substantially vertically. At this point, $CF_p{}^+$ and $F^+$ out of the ions 10 cut bonds between W and C by their kinetic energy so as to react with W, resulting in releasing $WF_x$ (wherein x=1 through 6). On the other hand, C is removed through etching by a nitrogen ion ($N^+$) and a hydrogen ion ($H^+$) mainly in the form of HCN, CN or $C_2N_2$. A part of C is re-released in the form of $CF_x$ (wherein x=1 through 4).

The etching reaction caused on the surface of the WC substrate will be described in more detail with reference to FIG. 1B. In particular, FIG. 1B shows an etching mechanism obtained when a substance including W and C is etched by using plasma generated from a mixed gas of a gas including a fluorine atom and a gas including a CN bond and a hydrogen atom.

As shown in FIG. 1B, after forming a resist pattern 12 on a WC substrate 11, the WC substrate 11 is etched with the resist pattern 12 used as a mask. At this point, in FIG. 1B, reference numerals 13a, 13b and 13c denote a $CF_p{}^+$ ion (wherein p=1, 2 or 3) and a $F^+$ ion, reference numerals 14a and 14b respectively denote a sidewall protecting film and a resist protecting film, a reference numeral 15 denotes a $CH_r{}^+$ ion (wherein r=1, 2 or 3) or a $H^+$ ion, a reference numeral 16 denotes a $CNH_s{}^+$ ion (wherein s=0, 1, 2, 3, 4 or 5), a $NH_q{}^+$ ion (wherein q=1 or 2) or a $N^+$ ion, and a reference numeral 17 denotes a $CH_r{}^*$ radical (wherein r=1, 2 or 3), a $CNH_s{}^*$ radical (wherein s=0, 1, 2, 3, 4 or 5), a $NH_q{}^*$ radical (wherein q=1 or 2), a $H^*$ radical or a $N^*$ radical. It is noted that the sidewall protecting film 14a is made of a mixture of a CHFN polymer and a $WF_x$ compound and covers and protects the side face of a pattern.

Next, the functions of the ions and the radicals will be described.

First, out of $CF_p{}^+$ (wherein p=1, 2 or 3) and $F^+$, the ion 13a substantially vertically entering the WC substrate 11 cuts a bond between W and C by its ion impact energy, and F is chemically bonded to W so as to produce a reaction product of $WF_x$. At this point, the $WF_x$ reacts with a plurality of incident ions 13a a plurality of times, so as to be ultimately released into the gas phase in the form of a molecule such as $WF_5$ or $WF_6$. This is the principal etching mechanism for the W included in the WC substrate 11.

Also, when a $NH_q{}^+$ ion (wherein q is 1 or 2), a $N^+$ ion and a $H^+$ ion enter the WC substrate 11, they cut bonds between W and C by their ion impact energy, and N and H are chemically bonded to C, resulting in removing through etching the C included in the WC substrate 11 in the form of a reaction product (principally HCN). This is the principal etching mechanism for the C included in the WC substrate 11. Furthermore, in this embodiment, a $CH_r{}^*$ radical (wherein r=1, 2 or 3), a $CNH_s{}^*$ radical (wherein s=0, 1, 2, 3, 4 or 5) and a hydrogen atom radical resulting from decomposition of the $CH_r{}^*$ and $CNH_s{}^*$ radicals, and a $CH_r{}^+$ ion (wherein r=1, 2 or 3), a $CNH_s{}^+$ ion (wherein s=0, 1, 2, 3, 4 or 5) and a $H^+$ ion resulting from decomposition of the $CH_r{}^+$ and $CNH_s{}^+$ ions are produced as decomposition products of the gas including a CN bond and a hydrogen atom, and therefore, hydrogen is supplied onto the etching reaction surface (including the bottom of a fine structure pattern). In particular, since the gas including a CN bond and a hydrogen atom is used, hydrogen can be efficiently supplied onto the substrate surface in the form of the $CNH_s{}^*$ radical (wherein s=0, 1, 2, 3, 4 or 5) and the $CNH_s{}^+$ ion (wherein s=0, 1, 2, 3, 4 or 5). Therefore, the probability of removing the C in the form of HCN through an ion assist etching reaction caused by the ion impact of a $NH_q{}^+$ ion (wherein q=1 or 2) and a $N^+$ ion is largely increased. In other words, since a nitrogen ion and hydrogen are simultaneously present on the etching reaction surface, the etching rate of the C is increased.

In this manner, according to this embodiment, not only the etching mechanism for W but also the mechanism for positively removing C through etching is attained, and therefore, rapid etching processing can be realized.

Next, the mechanism for forming the sidewall protecting film of this embodiment will be described.

The radicals 17 of the $CH_r{}^*$ radical (wherein r=1, 2 or 3), the $CNH_s{}^*$ radical (wherein s=0, 1, 2, 3, 4 or 5), the $NH_q{}^*$ radical (wherein q=1 or 2), the $H^*$ radical or the $N^*$ radical are isotropically diffused in the plasma gas phase to be transported to the surface of the WC substrate 11 and furthermore, are similarly isotropically diffused also within the fine structure formed on the substrate surface to be deposited within (on the side face and the bottom of) the fine structure. Accordingly, the principal component of the deposited film is the CHN polymer. In the case where the gas including a CN bond and a hydrogen atom is used as in this embodiment, large amounts of radicals and ions corresponding to the production source of the CHN polymer are supplied into the fine structure, and a part of the $CF_p^*$ radicals (wherein p=1, 2 or 3), which are essentially used for the etching, is also taken into the CHN polymer. As a result, the sidewall protecting film 14a is made of the CHFN polymer.

Also, some ions such as the ion 13b of the $CF_p^+$ ion (wherein p=1, 2 or 3) or the $F^+$ ion chemically react with the W on the etching reaction surface and the resultant reaction product $WF_x$ is released into the gas phase to be adsorbed onto the side face of the pattern of the WC substrate 11 or the side face of the resist pattern 12 during the etching. The adsorbed $WF_x$ is deposited on the side face of the pattern so as to form a part of the sidewall protecting film 14a. As a result, the actually formed sidewall protecting film 14a is made of the mixture of the CHFN polymer and the $WF_x$ composition. However, since the released $WF_x$ compound has a small property to deposit again, the content of the $WF_x$ compound within the polymer is small.

In this manner, as a characteristic of this embodiment, the gas including a CN bond and a hydrogen atom is particularly used, and therefore, the principal components of the sidewall protecting film are supplied not only in the form of the radicals but also in the form of the $CH_r^+$ ion (wherein r=1, 2 or 3) or the $CNH_s^+$ ion (wherein s=0, 1, 2, 3, 4 or 5). Accordingly, the $CH_r$ or the $CNH_s$, that is, the principal components of the polymer, is sufficiently supplied not only to an upper portion of the fine structure but also to the bottom and a portion of the side face close to the bottom of the fine structure.

The polymer formed on the bottom of the fine structure receives the impact energy of the entering $NH_q^+$ ion, $CH_r^+$ ion, $CNH_s^+$ ion or $CF_p^+$ ion, and a chemical reaction is caused through what is called an ion assist etching reaction, resulting in releasing from the bottom of the fine structure in the form of HCN, CN or $C_2N_2$. Accordingly, under conditions where the etching is proceeded through the ion assist etching reaction, most of substances adsorbed on the bottom of the pattern are removed through the etching simultaneously with a part of the WC substrate. However, since the amount of ions entering the side face of the pattern is much smaller than the amount of ions entering the bottom of the pattern, the amount of depositing ions is larger than the amount of ions proceeding the etching, and as a result, the deposition is produced so as to form the sidewall protecting film 14a.

Since the ions vertically enter the substrate surface owing to the RF bias, the amount of ions supplied onto the substrate surface, namely, the top face of the resist pattern 12, is substantially the same as the amount of ions supplied to the etching reaction surface on the bottom of the fine structure. On the other hand, the amount of radicals supplied to the bottom of the fine structure is reduced at least to a half or less as compared with the amount of radicals supplied onto the substrate surface. Accordingly, even when the etching reaction is efficiently caused on the bottom of the fine structure, the top face of the resist pattern 12 is protected by a thin deposited film (i.e., the resist protecting film 14b), and hence, the etching resistance of the resist pattern 12 is improved.

In the conventional technique, owing to an ion component obliquely entering the substrate like the ion 13c of $CF_p^+$ (wherein p=1, 2 or 3) or $F^+$, the pattern side face is etched to be formed in a bowing shape. On the contrary, in this embodiment, the etching of the pattern side face by the ion 13c is prevented by the sidewall protecting film 14a, and hence, the bowing shape caused in the conventional technique can be avoided. As a result, a fine concavo-convex pattern with side faces in a vertical or downward tapered shape can be formed. Although not shown in FIG. 1B, when the supply amount of the gas including a CN bond and a hydrogen atom is increased, the thickness of the sidewall protecting film 14a can be increased, so that the pattern side face can be formed in a downward tapered shape.

As described so far, according to the dry etching method of this embodiment, etching processing for attaining a highly precise vertical shape or a downward tapered shape free from a bowing shape can be formed on and inside a WC alloy, that is, a substance including tungsten and carbon as principal components.

In this manner, as the essence of this invention, the etching of W by an ion including a fluorine atom, the etching of C by an ion including a nitrogen atom and an effect to protect the side face of a pattern, which is formed through the etching, by a gas including a CN bond and a hydrogen atom (including a molecule produced through dissociation) are simultaneously attained.

In this embodiment, any of a fluorine molecule, fluorocarbon and fluorohydrocarbon or a mixture of two or more of them is used as the gas including a fluorine atom. For example, a gas of $F_2$, $CF_4$, $C_2F_6$, $C_3F_8$, $C_4F_6$, (cyclic or linear) $C_4F_8$, (cyclic or linear) $C_5F_5$, $CHF_3$, $CH_2F_2$, $CH_3F$ or the like, or a CF gas with a higher molecular weight for ecological use may be used. When such a gas is used, fluorine and a dissociated molecule including fluorine necessary for etching the tungsten (W) included in the substance including W and C can be efficiently produced through plasma discharge.

Furthermore, in this embodiment, any of alkylamine [R—$NH_2$], dialkylamine [$R_2$—NH] and trialkylamine [$R_3$—N] or a mixture of two or more of them is used as the gas including a CN bond and a hydrogen atom. Since these gases have comparatively small molecules, they can be easily dissociated through the plasma, and hence, hydrogen and a $CNH_s$ molecule (wherein s=0, 1, 2, 3, 4 or 5) can be efficiently supplied. As a result, the sidewall protecting film can be efficiently formed even in etching for forming a high-aspect ratio pattern. The alkyl group R may be linear or cyclic. Examples of the alkylamine are methylamine ($CH_3NH_2$; having a boiling point of −6.33° C. at 1 atm. (760 mmHg, which is also applied below)), ethylamine ($C_2H_5NH_2$; having a boiling point of 16.6° C. at 1 atm.), n-propylamine ($CH_3(CH_2)_2NH_2$; having a boiling point of 48° C. at 1 atm.), isopropylamine (($CH_3)_2CHNH_2$; having a boiling point of 33.5° C. at 1 atm.), 3-dimethylaminopropylamine (($CH_3)_2NCH_2CH_2CH_2NH_2$; having a boiling point of 135° C. at 1 atm.), n-butylamine ($CH_3(CH_2)_3NH_2$; having a boiling point of 68.5° C. at 1 atm.) and isobutylamine (($CH_3)_2CH$—$CH_2NH_2$; having a boiling point of 78° C. at 1 atm.). Examples of the dialkylamine are dimethylamine (($CH_3)_2NH$; having a boiling point of 6.9° C. at 1 atm.), diethylamine (($C_2H_5)_2NH$; having a boiling point of 55.4° C. at 1 atm.), di-n-propylamine ($CH_3(CH_2)_2NH_2$; having a boiling point of 48° C. at 1 atm.), diisopropylamine ($CH_3$—$CH(CH_3)$—NH—$CH(CH_3)$—$CH_3$; having a boiling point of 84° C. at 1 atm.), sec-butylamine ($CH_3CH(NH_2)C_2H_5$; having a boiling point of 63° C. at 1 atm.), di-n-butylamine (($CH_3CH_2CH_2CH_2)_2NH$; having a boiling point of 159° C. at 1 atm.) and diisobutylamine ($CH_3CH(CH_3)CH_2NHCH_2CH(CH_3)CH_3$; having a boiling point of 140° C. at 1 atm.).

Examples of the trialkylamine are trimethylamine (($CH_3$)$_3$N; having a boiling point of 3° C. at 1 atm.), triethylamine (($C_2H_5$)$_3$N; having a boiling point of 89.5° C. at 1 atm.) and tributylamine (($CH_3CH_2CH_2CH_2$)$_3$N; having a boiling point of 216.5° C. at 1 atm.). Furthermore, aniline ($C_6H_5NH_2$; having a boiling point of 184° C. at 1 atm.) or the like may be used as a gas including a cyclic alkyl group. Alternatively, a gas including two or more amines such as ethylenediamine ($H_2NCH_2CH_2NH_2$; having a boiling point of 117° C. at 1 atm.) may be used. Also, as the gas including a CN bond and a hydrogen atom, a nitrile compound such as acetonitrile ($CH_3CN$; having a boiling point of 82° C. at 1 atm.) or acrylonitrile ($CH_2$=CH—CN; having a boiling point of 77° C. at 1 atm.); an imine compound such as ethyleneimine ($CH_2NHCH_2$; having a boiling point of 56.5° C. at 1 atm.) or propyleneimine ($C_3H_7N$; having a boiling point of 77° C. at 1 atm.); a hydrazine compound such as methylhydrazine ($CH_3NHNH_2$; having a boiling point of 87.5° C. at 1 atm.) or 1,1-dimethylhydrazine ($NH_2$—N($CH_3$)$_2$; having a boiling point of 63° C. at 1 atm.); or an amide compound such as N,N-dimethylacetamide ($CH_3CON(CH_3)_2$; having a boiling point of 165° C. at 1 atm.) or N,N-dimethylformamide ($HCON(CH_3)_2$; having a boiling point of 153° C. at 1 atm.) may be used. Needless to say, hydrogen cyanide (HCN; having a boiling point of 26° C. at 1 atm.), that is, the smallest gas including a CN bond and a hydrogen atom, may be used, but the hydrogen cyanide is the most dangerous gas in the safety. In using each of the aforementioned gases, although a gas having a high boiling point is sufficiently practically used as far as a technique to change the material into a gas from a liquid or a solid immediately before supplying it to the reaction chamber is employed, a gas having a boiling point of 100° C. or less is more convenient for safely supplying the gas. It goes without saying that a plurality kinds of (two or more kinds of) above-described gases can be mixed to be used in this embodiment.

Moreover, in this embodiment, the mixed gas of the gas including a fluorine atom and the gas including a CN bond and a hydrogen atom may be replaced with a gas including a fluorine atom, a CN bond and a hydrogen atom (such as 1-fluoro-2,4-dinitrobenzene ($C_6H_3F(NO_2)_2$) or 2-fluoro-1,3, 5-trinitrobenzene ($C_6H_2F(NO_2)_3$)).

Furthermore, in this embodiment, the mixed gas of the gas including a fluorine atom and the gas including a CN bond and a hydrogen atom may further include a hydrogen molecule. A hydrogen molecule is indispensable for removing through etching the carbon included in the substance including W and C in the form of HCN. Specifically, in the case where a hydrogen molecule is additionally included, the removal of the carbon included in the substance including W and C is easily proceeded by adjusting the amount of hydrogen molecules to be included, and hence, the etching rate can be increased as a whole. Practically, the flow rate of a desired hydrogen molecule gas is set within a range of 50% or less of the total gas flow rate. The flow rate to be set depends upon the gas including a fluorine atom to be used, the gas including a CN bond and a hydrogen atom to be used and the plasma generation method to be employed, and hence can be optimized in consideration of these conditions.

Moreover, in this embodiment, the mixed gas of the gas including a fluorine atom and the gas including a CN bond and a hydrogen atom may further include a gas including an oxygen atom. For example, when any of an oxygen molecule, a nitrogen oxide molecule, a sulfur oxide molecule and a carbon oxide molecule or a mixture of two or more of them is used as the gas including an oxygen atom, oxygen can be efficiently supplied. When the gas including an oxygen atom is thus additionally used, an oxygen atom, an oxygen molecule, an oxygen atom ion or an oxygen molecule ion is produced in the plasma. As a result, the carbon included in the substance including W and C and a deposition such as an excessive portion of the sidewall protecting film can be appropriately removed and the etching rate can be increased. This is because an effect to remove the carbon in the form of $CO_2$ or CO is caused by an oxygen radical or an oxygen ion in addition to the aforementioned effect to remove the carbon. Practically, the flow rate of a desired gas including an oxygen atom is set within a range of 50% or less of the total gas flow rate. The flow rate to be set depends upon the gas including a fluorine atom to be used, the gas including a CN bond and a hydrogen atom to be used and the plasma generation method to be employed, and hence can be optimized in consideration of these conditions. In particular, in the case where a gas including an oxygen atom is used in addition to a gas including a fluorine atom with a small amount of carbon, the aforementioned effect may be exhibited even when the flow rate of the gas including an oxygen atom is approximately 10% or less or even several % or less of the total gas flow rate.

Furthermore, in this embodiment, an inert gas may be further mixed with the mixed gas of the gas including a fluorine atom and the gas including a CN bond and a hydrogen atom. When an inert gas is mixed, the plasma discharge can be further stabilized due to an inert gas effect, and hence, what is called a process window can be easily increased. In particular, when an inert gas is mixed at a flow rate several times as large as the total flow rate of the gas including a fluorine atom and the gas including a CN bond and a hydrogen atom, the electron temperature within the plasma is regulated by the electron temperature of the inert gas, resulting in stabilizing the plasma discharge. Alternatively, in the case where an inert gas is used also for reducing the residence time of the mixed gas of the gas including a fluorine atom and the gas including a CN bond and a hydrogen atom in the reaction chamber, the inert gas may be included at a flow rate approximately ten times as large as that of the mixed gas. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas, and therefore, when plasma with a higher electron temperature is desired to generate, an inert gas with a smaller atomic number is used, and when plasma with a lower electron temperature is desired to generate, an inert gas with a larger atomic number is used. At this point, two or more inert gases may be mixedly used.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system and a neutral loop discharge (NLD) etching system. Also, the optimal etching conditions are different depending upon the method employed by the etching system, and the ranges of the etching conditions of this embodiment are, for example, a gas flow rate of several tens through several hundreds cc/min. (at room temperature), a pressure of 0.1 through 20 Pa, a high-frequency power for plasma generation of 100 through several kW, and an RF bias voltage of 100 through 1 kW.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained in etching a WCN alloy or a WNC alloy.

Embodiment 2

Now, a dry etching method according to Embodiment 2 of the invention will be described with reference to the accompanying drawings. A difference of the dry etching method of this embodiment from that of Embodiment 1 is that a substance including W and C is dry etched by using plasma generated with a gas including a nitrogen atom further added to the mixed gas of the gas including a fluorine atom and the gas including a CN bond and a hydrogen atom.

Figure 2A:
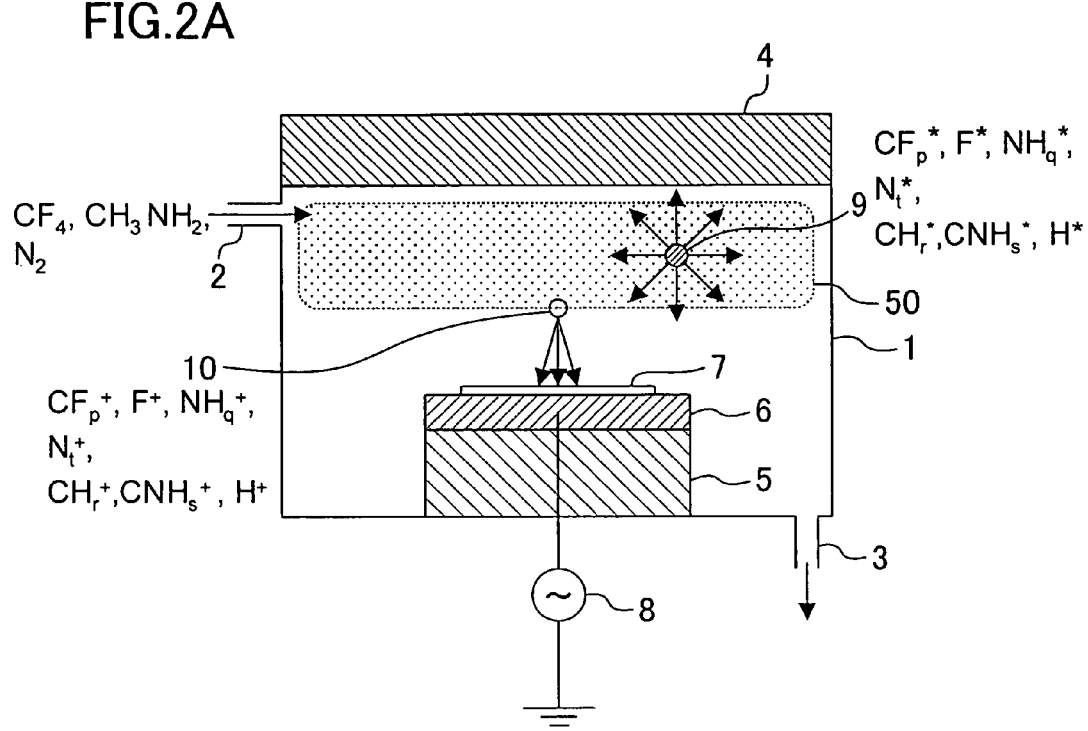
FIGS. 2A and 2B are explanatory diagrams of a dry etching method according to Embodiment 2 of the invention.
Figure 2B:
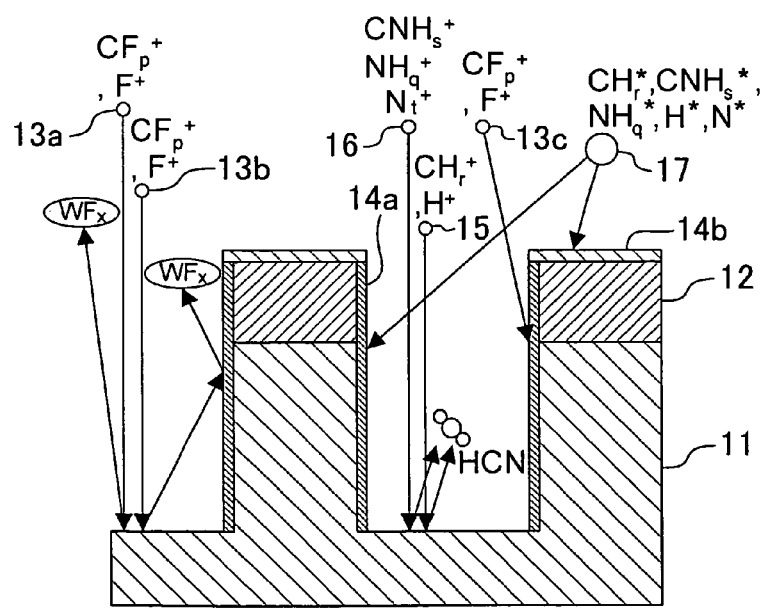

FIGS. 2A and 2B are explanatory diagrams of the dry etching method of Embodiment 2 of the invention. In FIGS. 2A and 2B, like reference numerals are used to refer to like elements used in Embodiment 1 shown in FIGS. 1A and 1B so as to omit the description. Also, in FIGS. 2A and 2B, a mixed gas of $CF_4$, $CH_3NH_2$ and $N_2$ is used as an etching gas.

In this embodiment, as shown in FIGS. 2A and 2B, although the kinds of produced radicals and ions are not different from those produced in Embodiment 1 shown in FIGS. 1A and 1B, the production amounts of nitrogen radicals $N_t^*$ (wherein t=1 or 2) and nitrogen ions $N_t^+$ (wherein t=1 or 2) can be independently adjusted differently from Embodiment 1. Specifically, the production amounts of the nitrogen radicals and the nitrogen ions can be respectively controlled independently of the production amounts of other radicals and other ions by controlling the supply ratio of a nitrogen gas flow rate in the total gas flow rate.

The nitrogen ions produced from the gas including a nitrogen atom exhibit driving power particularly in the principal reaction mechanism for removing the C included in the substance including W and C. On the other hand, the gas including a CN bond and a hydrogen atom such as $CH_3NH_2$ plays a part to adjust the quantity of a deposited film. In other words, a sidewall protecting film of a fine structure and components deposited on the bottom of the fine structure are respectively produced by supplying dissociated molecules mainly of the gas including a CN bond and a hydrogen atom in the form of radicals. At this point, since an etching reaction seed (etchant) is supplied in the form of a $CF_p^+$ ion (wherein p=1, 2 or 3), a nitrogen ion or the like onto the etching reaction surface on the bottom of the fine structure, the etching of the substance including W and C is proceeded. Therefore, the formation of the sidewall protecting film and the etching reaction can be independently controlled. Accordingly, when the supply ratio in the gas flow rate between the gas including a nitrogen atom and the gas including a CN bond and a hydrogen atom is controlled, the substance including W and C can be more rapidly etched as compared with the case where the same etching shape is attained without using the gas including a nitrogen atom.

Furthermore, in this embodiment, since the etching amount and the quantity of the sidewall protecting film are independently controlled in the aforementioned manner, the taper angle of the side face of the pattern can be adjusted in a range from a vertical shape (with a thin sidewall protecting film) to a downward tapered shape (with a thick sidewall protecting film) as compared with the case where the same etching rate is attained without using the gas including a nitrogen atom.

Moreover, in this embodiment, the gas including a nitrogen atom may be a nitrogen molecule, an ammonia molecule or a mixture of them. In the case where a nitrogen molecule is used, the supply amount of nitrogen alone can be directly controlled as described above. On the other hand, in the case where an ammonia molecule is used, although hydrogen is simultaneously supplied, the amount of molecules or atoms including nitrogen produced in the plasma can be controlled independently of the gas including a CN bond and a hydrogen atom. However, in this case, not only the concentration of nitrogen but also the concentration of hydrogen is increased. In the case where the carbon included in the substance including W and C is removed through etching in the form of HCN, however, a hydrogen atom is necessary, and hence, the increase of the hydrogen concentration results in increasing the etching rate of the substance including W and C.

Also, in this embodiment, the gas including a nitrogen atom is not limited to a nitrogen molecule or an ammonia molecule but can be any of other molecules capable of positively supplying a nitrogen atom. Thus, the same effects as those of this embodiment can be attained.

Furthermore, in this embodiment, the gas including a fluorine atom and the gas including a nitrogen atom can be replaced with a gas including a fluorine atom and a nitrogen atom.

Embodiment 3

Now, a dry etching method according to Embodiment 3 of the invention will be described with reference to the accompanying drawings. A difference of the dry etching method of this embodiment from that of Embodiment 1 is that a substance including W and C is dry etched by using plasma generated with a gas including a hydrocarbon molecule further added to the mixed gas of the gas including a fluorine atom and the gas including a CN bond and a hydrogen atom.

Figure 3A:
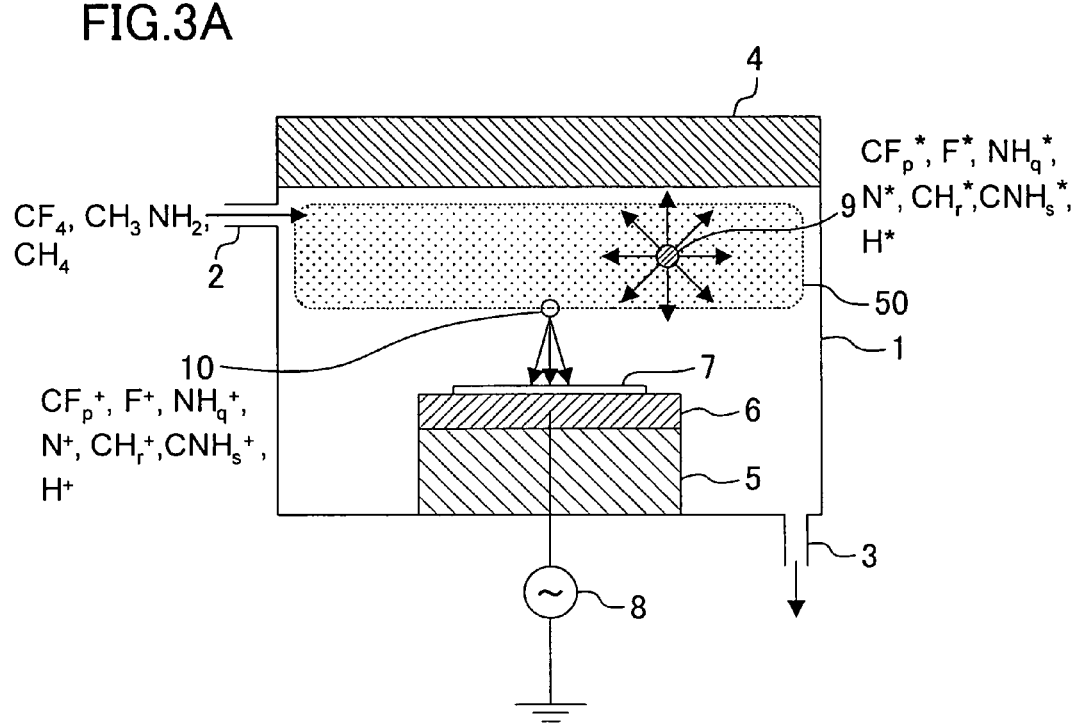
FIGS. 3A and 3B are explanatory diagrams of a dry etching method according to Embodiment 3 of the invention.
Figure 3B:
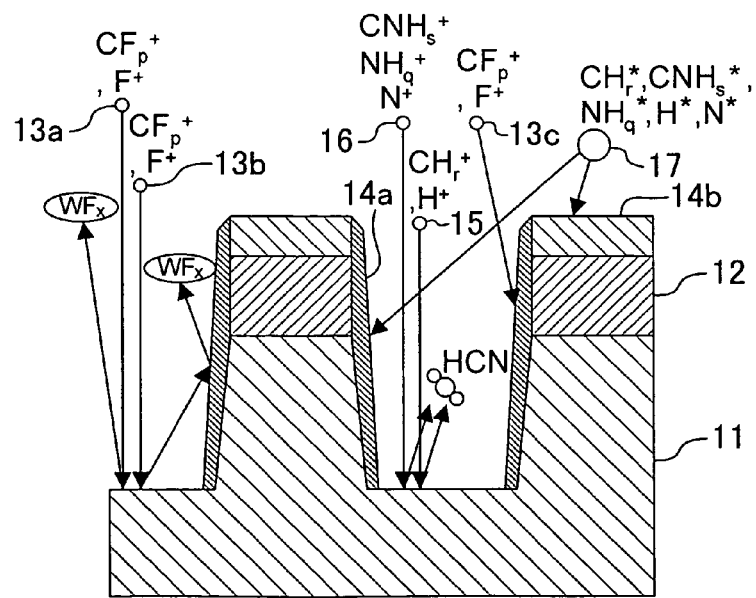

FIGS. 3A and 3B are explanatory diagrams of the dry etching method of Embodiment 3 of the invention. In FIGS. 3A and 3B, like reference numerals are used to refer to like elements used in Embodiment 1 shown in FIGS. 1A and 1B so as to omit the description. Also, in FIGS. 3A and 3B, a mixed gas of $CF_4$, $CH_3NH_2$ and $CH_4$ is used as an etching gas.

In this embodiment, as shown in FIGS. 3A and 3B, although the kinds of produced radicals and ions are not different from those produced in Embodiment 1 shown in FIGS. 1A and 1B, the production amounts of $CH_r^*$ radicals (wherein r=1, 2 or 3) and $CH_r^+$ ions (wherein r=1, 2 or 3) can be independently adjusted differently from Embodiment 1. Specifically, the production amounts of the $CH_r^*$ radicals and the $CH_r^+$ ions can be respectively controlled independently of the production amounts of other radicals and other ions by controlling the supply ratio of a $CH_4$ flow rate in the total gas flow rate.

Since the adsorption coefficient (sticking coefficient) of the $CH_r^*$ radical (wherein r=1, 2 or 3) is small, it is supplied into a fine structure during the etching so as to make a large contribution to the formation of a sidewall protecting film. Simultaneously, the $CH_r^*$ radical (wherein r=1, 2 or 3) is positively deposited on a resist pattern 12. On the other hand, a $CH_4$ radical not dissociated has a large adsorption coefficient, and hence is easily deposited particularly on the resist pattern 12. Therefore, when the $CH_4$ gas is additionally used, a protecting film 14b with a large thickness is formed on the resist pattern as compared with the case where the $CH_4$ gas is not used. As a result, as the supply ratio of the $CH_4$ gas flow rate in the total gas flow rate is larger, a sidewall protecting film 14a is formed in a larger thickness, and hence, a downward tapered shape can be more easily formed. Furthermore, as the supply ratio of the $CH_4$ gas flow rate in the total gas flow rate is larger, the effect to protect the top face of the resist pattern is increased, resulting in improving the etching resistance of the resist pattern 12.

In this embodiment, since the etching amount and the quantity of the sidewall protecting film are independently controlled as described above, the taper angle of the side face of the pattern can be adjusted in a range from a vertical shape (with a thin sidewall protecting film) to a downward tapered shape (with a thick sidewall protecting film) as compared with the case where the same etching rate is attained without using the gas including a hydrocarbon molecule. Also, high etching resistance of the resist pattern can be realized in the etching.

As the hydrocarbon molecule used as the etching gas in this embodiment, a molecule of $C_{2i}H_{(2i+2)}$, $C_{2i}H_{(2i+1)}$, $C_{2i}H_{2i}$ or the like (wherein i is a natural number Also, the hydrocarbon molecule may be linear or cyclic. Furthermore, the hydrocarbon molecule is not limited to a molecule represented as above. Specifically, for example, any of $CH_4$, $C_2H_4$, $C_2H_6$, . . . , $C_4H_8$, etc. may be used. However, a saturated hydrocarbon molecule, $C_{2i}H_{(2i+2)}$, is practically preferably used. Since the saturated hydrocarbon molecule does not include a double bond, it can be easily decomposed through the plasma discharge, and $CH_r$ (wherein r=1 through 3) can be efficiently produced as a decomposition product. Accordingly, the protecting film for the pattern side face can be efficiently formed from the $CH_r$ during the etching. Also, since a small decomposed (dissociated) molecule such as $CH_r$ (wherein r=1 through 3) particularly has a small adsorption coefficient, it can enter the inside of a fine structure pattern with a high aspect ratio (a depth/width ratio). In particular, $CH_4$, that is, the smallest molecule among saturated hydrocarbon molecules, has the largest H/C ratio, and hence has the lowest deposition property among the saturated hydrocarbon molecules. This property is remarkable particularly when molecules not dissociated are compared. Therefore, for efficiently producing the $CH_r$ (wherein r=1 through 3) radical affecting the side face of a fine pattern, $CH_4$ is the easiest to handle and practically the most effective.

Embodiment 4

Now, a dry etching method according to Embodiment 4 of the invention will be described with reference to the accompanying drawings. A difference of the dry etching method of this embodiment from that of Embodiment 1 is that a substance including W and C as principal components is dry etched by using plasma generated with at least one of a gas including a chlorine atom, a gas including a bromine atom and a gas including an iodine atom further added to the mixed gas of the gas including a fluorine atom and the gas including a CN bond and a hydrogen atom.

Figure 4A:
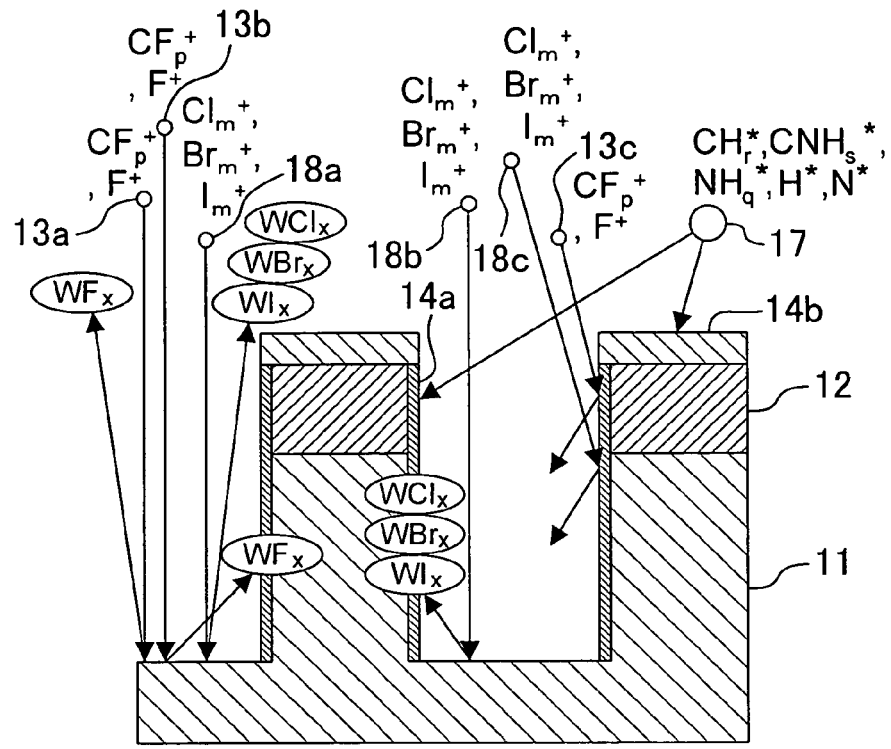
FIGS. 4A and 4B are explanatory diagrams of a dry etching method according to Embodiment 4 of the invention.
Figure 4B:
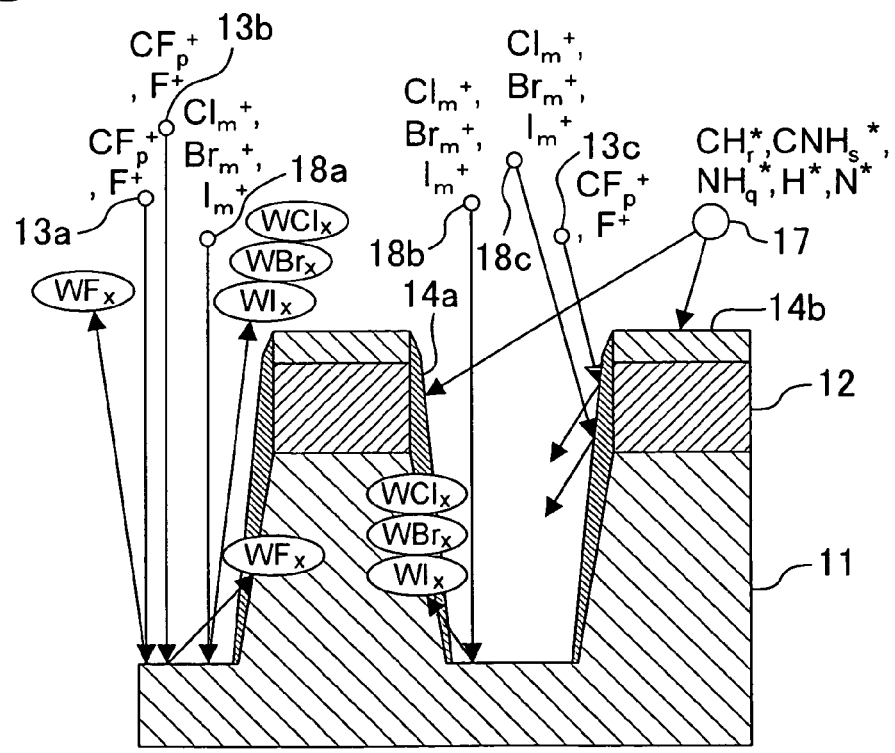

FIGS. 4A and 4B are explanatory diagrams of the dry etching method of Embodiment 4 of the invention, in each of which a state of a WC substrate being etched by the dry etching method of this embodiment is shown. Specifically, FIG. 4A shows a case where a sidewall protecting film is formed in a small thickness and FIG. 4B shows a case where a sidewall protecting film is formed in a large thickness. Also, in FIGS. 4A and 4B, like reference numerals are used to refer to like elements used in Embodiment 1 so as to omit the description. Now, the dry etching method of this embodiment will be described by exemplifying a case where $Cl_2$, $Br_2$ and $I_2$ are used respectively as the gas including a chlorine atom, the gas including a bromine atom and the gas including an iodine atom to be added to the etching gas of Embodiment 1.

Since the basic mechanism of the etching is the same as that of Embodiment 1, the effect attained by a $Cl^+$ ion, a $Br^+$ ion and an $I^+$ ion corresponding to the difference from Embodiment 1 will be specifically described.

As shown in FIGS. 4A and 4B, after forming a resist pattern 12 on a WC substrate 11, the WC substrate 11 is etched by using the resist pattern 12 as a mask. Specifically, in addition to the etching reaction for tungsten caused by ions 13a, 13b and 13c including fluorine atoms, which are the same as those of Embodiment 1, the tungsten included in the WC substrate 11 is etched also by ions 18a, 18b and 18c corresponding to a $Cl_m^+$ ion (wherein m=1 or 2) produced from $Cl_2$, a $Br_m^+$ ion (wherein m=1 or 2) produced from $Br_2$ and an $I_m^+$ ion (wherein m=1 or 2) produced from $I_2$. At this point, reaction products are released into the gas phase and removed in the form of $WCl_x$, $WBr_x$ or $WI_x$ (wherein x=1 through 6). Furthermore, a part of an etching reaction product produced by the ion 18b corresponding to a $Cl_m^+$ ion, a $Br_m^+$ ion or an $I_m^+$ ion is adsorbed again onto an etched side face of the WC substrate 11 or the side face of the resist pattern 12 so as to form a sidewall protecting film 14a. The adsorption probabilities attained at this point are in the order of $WI_x > WBr_x > WCl_x > WF_x$. Accordingly, the sidewall protecting film 14a of this embodiment is made of not a mixture of $CH_r$ (wherein r=1, 2 or 3) and $WF_x$ as in Embodiment 1 but a mixture of $CH_r$ and $WCl_x$, $WBr_x$ or $WI_x$. As a result, an etching reaction caused on the pattern side face of the WC substrate 11 by an ion obliquely entering the substrate surface like ions 13c and 18c is prevented by the sidewall protecting film 14a. Accordingly, in the case where the sidewall protecting film 14a is comparatively thin, a vertical etching shape can be realized on and inside the WC substrate 11 as shown in FIG. 4A, and in the case where the sidewall protecting film 14a is comparatively thick, a downward tapered etching shape can be realized on and inside the WC substrate 11 as shown in FIG. 4B.

As described so far, in the case where the gas for producing a $Cl_m^+$ ion, a $Br_m^+$ ion or an $I_m^+$ ion is additionally used, owing to such a gas, an effect to form the sidewall protecting film is more remarkable than the effect to etch the tungsten.

In this embodiment, the mixing ratio of the gas including a chlorine atom, the gas including a bromine atom or the gas including an iodine atom is approximately 50% or less of the total gas flow rate. Also, in the case where the gas including a bromine atom or the gas including an iodine atom is used, even when the mixing ratio to the total gas flow rate is less than 5%, the effect to form the sidewall protecting film can be sufficiently attained. Furthermore, as described in Embodiment 1, any etching shape ranging from a vertical shape to a downward tapered shape can be realized through the etching using the plasma generated from the mixed gas of the gas including a fluorine atom and the gas including a CN bond and a hydrogen atom. Therefore, in the case where a vertical etching shape is desired to attain with the gas for producing a $Cl_m^+$ ion, a $Br_m^+$ ion or an $I_m^+$ ion additionally used, the mixing ratio to the total gas flow rate of the gas including a chlorine atom, the gas including a bromine atom or the gas including an iodine atom may be less than several %.

In this embodiment, the first effect attained by additionally using the gas for producing a $Cl_m^+$ ion, a $Br_m^+$ ion organ $I_m^+$ ion is exhibited particularly when the substance including W and C is subjected to high-aspect ratio etching, namely, is deeply etched. Specifically, since $CH_r^*$ radicals and $CNH_s^*$ radicals are supplied while diffusing from above and into an etched pattern (a recess), the thickness of the sidewall protecting film formed on the bottom of the etched pattern is smaller than that formed on an upper portion of the etched pattern. On the contrary, $WCl_x$, $WBr_x$ or $WI_x$ produced through the etching reaction caused by a $Cl_m^+$ ion, a $Br_m^+$ ion or an $I_m^+$ ion is released from the bottom of the etched pattern corresponding to the etching reaction surface and is adsorbed again onto the side face of the etched pattern, and therefore, it is more easily adsorbed onto a lower portion of the side face of the etched pattern than an upper portion thereof. In this manner, when a substance including W and C is etched by using plasma generated with any of a gas including a chlorine atom, a gas including a bromine atom and a gas including an iodine atom added to the mixed gas of the gas including a fluorine atom and the gas including a CN bond and a hydrogen atom, vertical shape etching or downward tapered shape etching can be realized in high-aspect ratio pattern processing.

Moreover, the second effect attained by additionally using the gas including a chlorine atom, the gas including a bromine atom or the gas including an iodine atom in this embodiment is that a downward tapered shape can be easily realized as shown in FIG. 4B. Specifically, when the gas including a chlorine atom, the gas including a bromine atom or the gas including an iodine atom is mixed in a ratio of 5% or more to the total gas flow rate of the gas used for generating the plasma, the sidewall protecting film 14a can be easily formed in a comparatively large thickness owing to the mechanism for forming the sidewall protecting film described above. As a result, when the mixing ratio of the gas including a chlorine atom, the gas including a bromine atom or the gas including an iodine atom is adjusted in a range from several % to 30%, the tapered shape resulting from the etching can be freely changed. It is noted that the mixing ratio does not completely equally correspond to the tapered shape but the tapered shape is affected also by mixed gas species, plasma generation conditions and the like. Accordingly, not only when the mixing ratio is 30% but also when it is as high as approximately 50%, the controllability for the tapered shape may be kept.

The ability to form the sidewall protecting film by tungsten halide, that is, a reaction product, is in the order of $WI_x \gg WBr_x \gg WCl_x > WF_x$. Therefore, in the case where the gas including a chlorine atom, the gas including a bromine atom or the gas including an iodine atom is additionally used, it is necessary to optimize the mixing ratio of each gas. Also, a mixture of the gas including a chlorine atom, the gas including a bromine atom and the gas including an iodine atom may be used.

As described so far, in Embodiment 4, the substance including W and C is etched by using the plasma generated with the gas including a chlorine atom, the gas including a bromine atom or the gas including an iodine atom added to the mixed gas of the gas including a fluorine atom and the gas including a CN bond and a hydrogen atom, and therefore, the following effect can be attained in addition to the effects attained in Embodiment 1: Since the sidewall protecting effect for an etched portion can be increased, not only a vertical shape but also an arbitrary downward tapered shape can be easily realized in high-aspect ratio etching.

In this embodiment, for example, $Cl_2$, HCl, $ClF_3$ or the like may be used as the gas including a chlorine atom. Also, for example, $Br_2$, HBr or the like may be used as the gas including a bromine atom. Furthermore, for example, $I_2$, HI or the like may be used as the gas including an iodine atom. Alternatively, a gas including a chlorine atom and at least one of a bromine atom and an iodine atom, such as ICl, $ClF_2Br$, $ClF_2I$ or BrCl, may be used. Alternatively, a molecular gas including carbon, fluorine and halogen, such as $CF_xCl_{4-x}$, $CF_xBr_{4-x}$ or $CF_xI_{4-x}$ (wherein x=1 through 3), may be used. In this case, the effect to increase the etching rate obtained by F can be simultaneously expected as in Embodiment 2. Specifically, W reacts with halogen (F, Cl, Br or I) to be vaporized in the form of a reaction product of $WF_6$, $WCl_6$, $WBr_6$, $WI_6$ or the like, so as to proceed the etching reaction. The volatility of $WF_6$ is high (namely, its vapor pressure is low) but the volatility of tungsten halide such as $WCl_6$, $WBr_6$ or $WI_6$ is low, and hence, the etching reaction itself is the most easily caused in using F. Accordingly, for increasing the etching rate for the W, F is the most suitably used.

Furthermore, in this embodiment, a gas including a chlorine atom and a nitrogen atom (such as $NCl_3$), a gas including a bromine atom or an iodine atom and a nitrogen atom (such as $NBr_3$ or $NI_3$) or a gas including a chlorine atom and an oxygen atom (which may further include a bromine atom, an iodine atom or a nitrogen atom; such as $COCl_2$, $ClFO_3$, NOCl, $NO_2Cl$, $SOCl_2$, $SO_2Cl_2$ or $SO_3HCl$) may be used.

Embodiment 5

Now, a fine structure formation method and a mold fabrication method by employing the same according to Embodiment 5 of the invention will be described with reference to the accompanying drawings. It is noted that the dry etching methods described in Embodiments 1 through 4 are applied in this embodiment.

FIGS. 5A through 5F are cross-sectional views for showing procedures in the mold fabrication method of Embodiment 5.

Figure 5A:
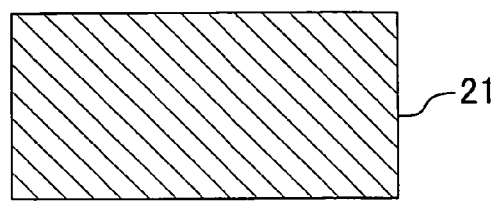
FIGS. 5A, 5B, 5C, 5D, 5E and 5F are cross-sectional views for showing procedures in a fine structure formation method according to Embodiment 5 of the invention and a mold fabrication method by employing the same.
Figure 5B:
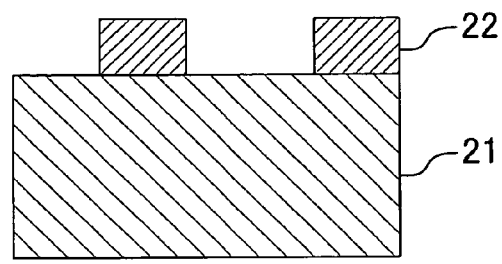

First, a WC alloy substrate 21 is prepared as shown in FIG. 5A, and then, a resist pattern 22 is formed on the WC alloy substrate 21 as shown in FIG. 5B. At this point, the resist pattern 22 is generally formed through the lithography technique.

Figure 5C:
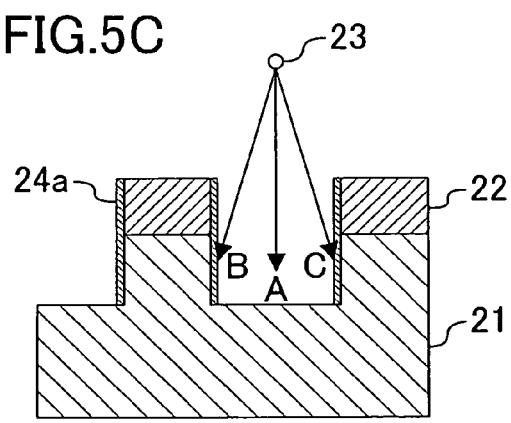

Next, under etching conditions for forming a sidewall protecting film in a small thickness (see Embodiment 4 (and FIG. 4A in particular)), the WC alloy substrate 21 is dry etched, with the resist pattern 22 used as a mask, by using plasma generated from a mixed gas at least of a gas including a fluorine atom and a gas including a CN bond and a hydrogen atom, thereby transferring the pattern onto the WC alloy substrate 21 as shown in FIG. 5C. In general, no matter which type of dry etching system is used for the dry etching, ions 23 entering the WC alloy substrate 21 from the plasma have energy spread, and therefore, there are not only a component A vertically entering the substrate surface but also components entering the substrate surface at an angle, namely, obliquely entering components B and C. However, when the dry etching is performed by using the plasma generated from the mixed gas at least of the gas including a fluorine atom and the gas including a CN bond and a hydrogen atom, etching reaction products such as $WF_x$ (wherein x=1 through 6) form a sidewall protecting film 24a on the side face of the etched portion, and therefore, the side face can be prevented from being etched by the obliquely entering components B and C of the ions 23. Accordingly, as shown in FIG. 5C, a fine structure having a cross-section vertical to the substrate surface as the etched cross-section is formed.

Next, the resist pattern 22 and the sidewall protecting film 24a are removed by ashing and cleaning. In this manner, a WC alloy mold made of the WC alloy substrate 21 having a fine concavo-convex structure with vertical side faces is fabricated as shown in FIG. 5D.

Figure 5E:
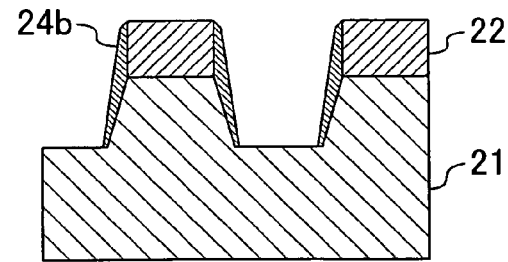
Figure 5D:
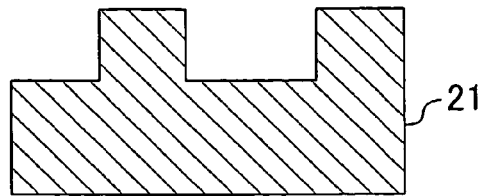

On the other hand, instead of the procedures shown in FIGS. 5C and 5D, the pattern may be transferred onto the WC alloy substrate 21 by dry etching the WC alloy substrate 21, with the resist pattern 22 used as a mask, by using plasma generated from a mixed gas at lest of a gas including a fluorine atom and a gas including a CN bond and a hydrogen atom under etching conditions for forming a sidewall protecting film in a large thickness (see Embodiment 4 (and FIG. 4B in particular)) as shown in FIG. 5E. In this case, a fine structure having a downward tapered shape as the etched cross-section is formed in the WC alloy substrate 21. This is because since a sidewall protecting film 24b is deposited in a thickness larger than a necessary thickness for preventing the side face from being etched by the ions, an opening area of the etched portion becomes narrower as the etching is proceeded.

Figure 5F:
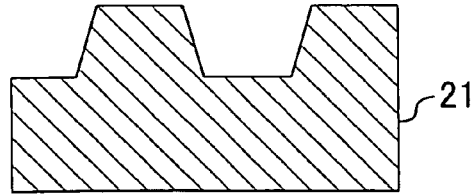

Next, the resist pattern 22 and the sidewall protecting film 24b are removed by the ashing and the cleaning. In this manner, a WC alloy mold made of the WC alloy substrate 21 having a fine concavo-convex structure with downward tapered side faces is fabricated as shown in FIG. 5F.

As described so far, the fine structure formation method and the mold fabrication method of this embodiment include the steps of forming a resist pattern on a substance including tungsten and carbon and etching the substance, with the resist pattern used as a mask, by using plasma generated from a mixed gas at least of a gas including a fluorine atom and a gas including a CN bond and a hydrogen atom. In other words, since the dry etching method of this invention (according to any of Embodiments 1 through 4) is employed in this embodiment, the surface and the inside of the substance including tungsten and carbon can be etched in a highly precise vertical shape or a highly precise downward tapered shape free from a bowing shape. Accordingly, a mold made of the substance including W and C and having a fine concavo-convex pattern with a vertical cross-sectional shape or a downward tapered cross-sectional shape can be definitely fabricated.

Although the resist pattern is used as the etching mask in this embodiment, it goes without saying that a hard mask made of an insulating film or the like may be used instead.

In this embodiment, any of a fluorine molecule, fluorocarbon and fluorohydrocarbon or a mixture of two or more of them is used as the gas including a fluorine atom. For example, a gas of $F_2$, $CF_4$, $C_2F_6$, $C_3F_8$, $C_4F_6$, (cyclic or linear) $C_4F_8$, (cyclic or linear) $C_5F_8$, $CHF_3$, $CH_2F_2$, $CH_3F$ or the like, or a CF gas with a higher molecular weight for ecological use may be used. When such a gas is used, fluorine and a dissociated molecule including fluorine necessary for etching the tungsten (W) included in the substance including W and C can be efficiently produced through the plasma discharge. Therefore, the substance including W and C can be more inexpensively and rapidly etched into a highly precise vertical shape or a highly precise downward tapered shape. As a result, a mold having a fine concavo-convex pattern with highly precise vertical or highly precise downward tapered side faces can be more inexpensively fabricated.

Furthermore, in this embodiment, any of alkylamine [R—$NH_2$], dialkylamine [$R_2$—NH] and trialkylamine [$R_3$—N] or a mixture of two or more of them is used as the gas including a CN bond and a hydrogen atom. Since these gases have comparatively small molecules, they can be easily dissociated through the plasma, and hence, hydrogen and a $CNH_s$ molecule (wherein s=0, 1, 2, 3, 4 or 5) can be efficiently supplied. In other words, since hydrogen and a $CNH_s$ molecule (wherein s=0, 1, 2, 3, 4 or 5) can be efficiently supplied to the inside of a fine structure (a recess) during the etching, a sidewall protecting film can be efficiently formed, and hence, vertical shape microprocessing or downward tapered shape microprocessing can be easily realized also in etching for forming a shape with a high aspect ratio. The alkyl group R may be linear or cyclic. Examples of the alkylamine are methylamine ($CH_3NH_2$; having a boiling point of −6.33° C. at 1 atm. (760 mmHg, which is also applied below)), ethylamine ($C_2H_5NH_2$; having a boiling point of 16.6° C. at 1 atm.), n-propylamine ($CH_3(CH_2)_2NH_2$; having a boiling point of 48° C. at 1 atm.), isopropylamine (($CH_3)_2CHNH_2$; having a boiling point of 33.5° C. at 1 atm.), 3-dimethylaminopropylamine (($CH_3)_2NCH_2CH_2CH_2NH_2$; having a boiling point of 135° C. at 1 atm.), n-butylamine ($CH_3(CH_2)_3NH_2$; having a boiling point of 68.5° C. at 1 atm.) and isobutylamine (($CH_3)_2$CH—$CH_2NH_2$; having a boiling point of 78° C. at 1 atm.). Examples of the dialkylamine are dimethylamine (($CH_3)_2$NH; having a boiling point of 6.9° C. at 1 atm.), diethylamine (($C_2H_5)_2$NH; having a boiling point of 55.4° C. at 1 atm.), di-n-propylamine ($CH_3(CH_2)_2NH_2$; having a boiling point of 48° C. at 1 atm.), diisopropylamine ($CH_3$—CH($CH_3$)—NH—CH($CH_3$)—$CH_3$; having a boiling point of 84° C. at 1 atm.), sec-butylamine ($CH_3CH(NH_2)C_2H_5$; having a boiling point of 63° C. at 1 atm.), di-n-butylamine (($CH_3CH_2CH_2CH_2)_2$NH; having a boiling point of 159° C. at 1 atm.) and diisobutylamine ($CH_3CH(CH_3)CH_2NHCH_2CH(CH_3)CH_3$; having a boiling point of 140° C. at 1 atm.). Examples of the trialkylamine are trimethylamine (($CH_3)_3$N; having a boiling point of 3° C. at 1 atm.), triethylamine (($C_2H_5)_3$N; having a boiling point of 89.5° C. at 1 atm.) and tributylamine (($CH_3CH_2CH_2CH_2)_3$N; having a boiling point of 216.5° C. at 1 atm.). Furthermore, aniline ($C_6H_5NH_2$; having a boiling point of 184° C. at 1 atm.) or the like may be used as a gas including a cyclic alkyl group. Alternatively, a gas including two or more amines such as ethylenediamine ($H_2NCH_2CH_2NH_2$; having a boiling point of 117° C. at 1 atm.) may be used. Also, as the gas including a CN bond and a hydrogen atom, a nitrile compound such as acetonitrile ($CH_3CN$; having a boiling point of 82° C. at 1 atm.) or acrylonitrile ($CH_2$=CH—CN; having a boiling point of 77° C. at 1 atm.); an imine compound such as ethyleneimine ($CH_2NHCH_2$; having a boiling point of 56.5° C. at 1 atm.) or propyleneimine ($C_3H_7$N; having a boiling point of 77° C. at 1 atm.); a hydrazine compound such as methylhydrazine ($CH_3NHNH_2$; having a boiling point of 87.5° C. at 1 atm.) or 1,1-dimethylhydrazine ($NH_2$—N($CH_3)_2$; having a boiling point of 63° C. at 1 atm.); or an amide compound such as N,N-dimethylacetamide ($CH_3CON(CH_3)_2$; having a boiling point of 165° C. at 1 atm.) or N,N-dimethylformaide (HCON($CH_3)_2$; having a boiling point of 153° C. at 1 atm.) may be used. Needless to say, hydrogen cyanide (HCN; having a boiling point of 26° C. at 1 atm.), that is, the smallest gas including a CN bond and a hydrogen atom, may be used, but the hydrogen cyanide is the most dangerous gas in the safety. In using each of the aforementioned gases, although a gas having a high boiling point is sufficiently practically used as far as a technique to change the material into a gas from a liquid or a solid immediately before supplying it to the reaction chamber is employed, a gas having a boiling point of 100° C. or less is more convenient for safely supplying the gas. It goes without saying that a plurality kinds of (two or more kinds of) above-described gases can be mixed to be used in this embodiment.

Moreover, in this embodiment, the mixed gas of the gas including a fluorine atom and the gas including a CN bond and a hydrogen atom may be replaced with a gas including a fluorine atom, a CN bond and a hydrogen atom (such as 1-fluoro-2,4-dinitrobenzene ($C_6H_3F(NO_2)_2$) or 2-fluoro-1,3,5-trinitrobenzene ($C_6H_2F(NO_2)_3$)).

Furthermore, in this embodiment, the mixed gas of the gas including a fluorine atom and the gas including a CN bond and a hydrogen atom may further include a hydrogen molecule. Thus, the etching efficiency for the carbon included in the substance including W and C is increased, so that a mold having a fine concavo-convex pattern with a vertical or tapered downward cross-section can be rapidly fabricated.

Moreover, in this embodiment, the mixed gas of the gas including a fluorine atom and the gas including a CN bond and a hydrogen atom may further include a gas including an oxygen atom. Thus, the carbon included in the substance including W and C and a deposition such as an excessive portion of the sidewall protecting film can be appropriately removed and the etching rate can be increased. Therefore, a mold having a fine concavo-convex pattern with a vertical or downward tapered cross-section can be further rapidly fabricated. For example, when any of an oxygen molecule, a nitrogen oxide molecule, a sulfur oxide molecule and a carbon oxide molecule or a mixture of two or more of them is used as the gas including an oxygen atom, oxygen can be efficiently supplied. When the gas including an oxygen atom is thus additionally used, an oxygen atom, an oxygen molecule, an oxygen atom ion or an oxygen molecule ion is produced in the plasma. As a result, the carbon included in the substance including W and C and a deposition such as an excessive portion of the sidewall protecting film can be appropriately removed and the etching rate can be further increased. This is because an effect to remove the carbon in the form of $CO_2$ or CO is caused by an oxygen radical or an oxygen ion in addition to the aforementioned effect to remove the carbon. Practically, the flow rate of a desired gas including an oxygen atom is set within a range of 50% or less of the total gas flow rate. The flow rate to be set depends upon the gas including a fluorine atom to be used, the gas including a CN bond and a hydrogen atom to be used and the plasma generation method to be employed, and hence can be optimized in consideration of these conditions. In particular, in the case where a gas including an oxygen atom is used in addition to a gas including a fluorine atom with a small amount of carbon, the aforementioned effect can be exhibited even when the flow rate of the gas including an oxygen atom is approximately 10% or less or even several % or less of the total gas flow rate.

Furthermore, in this embodiment, an inert gas may be further mixed with the mixed gas of the gas including a fluorine atom and the gas including a CN bond and a hydrogen atom. When an inert gas is mixed, the plasma discharge can be further stabilized due to the inert gas effect, and hence, what is called a process window can be easily increased. Accordingly, a mold having a fine concavo-convex pattern with a vertical or downward tapered cross-section can be stably fabricated. In particular, when an inert gas is mixed at a flow rate several times as large as the total flow rate of the gas including a fluorine atom and the gas including a CN bond and a hydrogen atom, the electron temperature within the plasma is regulated by the electron temperature of the inert gas, resulting in stabilizing the plasma discharge. Alternatively, in the case where an inert gas is used also for reducing the residence time of the mixed gas of the gas including a fluorine atom and the gas including a CN bond and a hydrogen atom in the reaction chamber, the inert gas may be included at a flow rate approximately ten times as large as that of the mixed gas. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas, and therefore, when plasma with a higher electron temperature is desired to generate, an inert gas with a smaller atomic number is used, and when plasma with a lower electron temperature is desired to generate, an inert gas with a larger atomic number is used. At this point, two or more inert gases may be mixedly used.

Moreover, in this embodiment, the mixed gas of the gas including a fluorine atom and the gas including a CN bond and a hydrogen atom preferably further includes a gas including a nitrogen atom. Thus, the power to remove the C included in the substance including W and C is increased, so as to increase the etching rate. Also, the cross-sectional shape of the fine structure can be easily controlled in a range from a vertical shape to a downward tapered shape. Accordingly, a mold having a fine concavo-convex pattern with a vertical or downward tapered cross-section can be rapidly fabricated with high controllability. It is noted that the gas including a fluorine atom and the gas including a nitrogen atom may be replaced with a gas including a fluorine atom and a nitrogen atom. Also, the gas including a nitrogen atom is preferably a nitrogen molecule, an ammonia molecule or a mixture of them. Since the molecular weight of such a gas is small, a nitrogen atom ion can be efficiently produced, and hence, the effect to increase the etching rate is more remarkably attained. Also, the cross-sectional shape of the fine structure can be easily controlled in the range from a vertical shape to a downward tapered shape.

Furthermore, in this embodiment, the mixed gas of the gas including a fluorine atom and the gas including a CN bond and a hydrogen atom preferably further includes a gas including a hydrocarbon molecule. Thus, the formation of the sidewall protecting film is accelerated and the effect to protect a resist is increased. Therefore, a mold having a fine concavo-convex pattern with a vertical or downward tapered cross-section can be more easily fabricated. Also, since the formation of the protecting film on the pattern side face during the etching is accelerated not only by a $CNH_s$ molecule but also $CH_r$ (wherein r=1 through 3), the vertical shape microprocessing or downward tapered shape microprocessing can be easily realized. The hydrocarbon molecule is preferably a saturated hydrocarbon molecule. Since the saturated hydrocarbon molecule does not include a double bond, it can be easily decomposed through the plasma discharge, and $CH_r$ (wherein r=1 through 3) can be efficiently produced as a decomposition product. Accordingly, the protecting film for the pattern side face can be efficiently formed from the $CH_r$ during the etching. As a result, the tapered shape can be more easily controlled, and therefore, a mold having a fine concavo-convex pattern with a vertical cross-section or a downward tapered cross-section can be more easily fabricated.

Alternatively, in this embodiment, the plasma is preferably generated with at least one of a gas including a chlorine atom, a gas including a bromine atom and a gas including an iodine atom further mixed with the mixed gas of the gas including a fluorine atom and the gas including a CN bond and a hydrogen atom. In this manner, the side face protecting function for the etched portion can be increased by chlorine, bromine or iodine, and hence, the vertical shape processing or downward tapered shape processing can be easily realized also in processing for a fine structure with a high aspect ratio. Specifically, a mold having a fine concavo-convex pattern with a vertical or downward tapered cross-section and a high aspect ratio can be easily fabricated. As the gas including a chlorine atom, for example, $Cl_2$, HCl, $ClF_3$ or the like is used. Also, as the gas including a bromine atom, for example, $Br_2$, HBr or the like is used. As the gas including an iodine atom, $I_2$, HI or the like is used. Alternatively, a gas including a chlorine atom and at least one of a bromine atom and an iodine atom, such as ICl, $ClF_2Br$, $ClF_2I$ or BrCl, may be used. Further alternatively, a molecular gas including carbon, fluorine and halogen, such as $CF_xCl_{4-x}$, $CF_xBr_{4-x}$, or $CF_xI_{4-x}$ (wherein x=1 through 3), may be used. Also, a gas including a chlorine atom and a nitrogen atom (such as $NCl_3$), a gas including a bromine atom or an iodine atom and a nitrogen atom (such as $NBr_3$ or $NI_3$) or a gas including a chlorine atom and an oxygen atom (which may further include a bromine atom, an iodine atom or a nitrogen atom; such as $COCl_2$, $ClFO_3$, $NOCl$, $NO_2Cl$, $SOCl_2$, $SO_2Cl_2$ or $SO_3HCl$) may be used.

Moreover, in this embodiment, in the case where the gas including a chlorine atom, the gas including a bromine atom or the gas including an iodine atom is used, the mixing ratio of these gases is approximately 50% or less of the total gas flow rate. Specifically, when the gas including a bromine atom or the gas including an iodine atom is used, the effect to form the sidewall protecting film can be sufficiently attained even if the mixing ratio to the total gas flow rate is less than 5%. Furthermore, as described in Embodiment 1, any etching shape ranging from a vertical shape to a downward tapered shape can be realized through the etching using the plasma generated from the mixed gas of the gas including a fluorine atom and the gas including a CN bond and a hydrogen atom. Therefore, in the case where a vertical etching shape is desired to attain with the gas for producing a $Cl_m^+$ ion, a $Br_m^+$ ion or an $I_m^+$ ion additionally used, the mixing ratio to the total gas flow rate of the gas including a chlorine atom, the gas including a bromine atom or the gas including an iodine atom may be less than several %.

Furthermore, the dimensional etching limit of the fine concavo-convex pattern obtained by the mold fabrication method of this embodiment largely depends upon the lithography technique employed for forming the resist pattern, and currently, the substance can be etched by the minimum dimension of approximately 50 nm.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system.

Although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained in etching a WCN alloy or a WNC alloy.

Embodiment 6

Now, a mold according to Embodiment 6 of the invention will be described with reference to the accompanying drawings. It is noted that the mold of this embodiment is obtained by the mold fabrication method described in Embodiment 5.

Figure 6A:
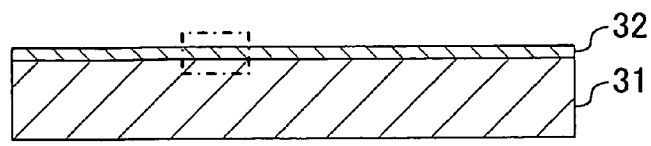
FIG. 6A is a cross-sectional view of a whole mold according to Embodiment 6 of the invention and FIGS. 6B, 6C, 6D, 6E, 6F and 6G are enlarged views for showing a fine concavo-convex pattern formed on the mold of FIG. 6A.

FIG. 6A is a cross-sectional view of the whole mold of this embodiment. As shown in FIG. 6A, a substance 32 including tungsten and carbon such as a WC alloy is formed on an underlying substrate 31. On the surface of the substance 32, a fine concavo-convex pattern with a vertical shape (a shape having a side face vertical to the substrate surface) or a downward tapered shape is formed by the dry etching method of any of Embodiments 1 through 4. Also, FIGS. 6B through 6D and 6E through 6G are enlarged views of the fine concavo-convex pattern formed on a surface portion (surrounded with an alternate long and short dash line) of the mold of FIG. 6A.

Figure 6B:
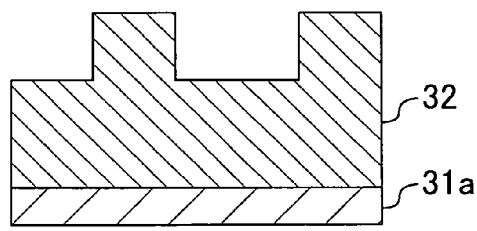
Figure 6E:
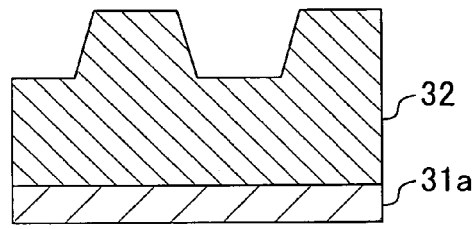
Figure 6C:
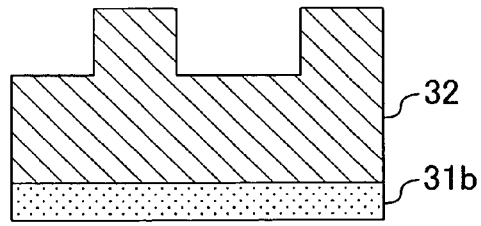
Figure 6F:
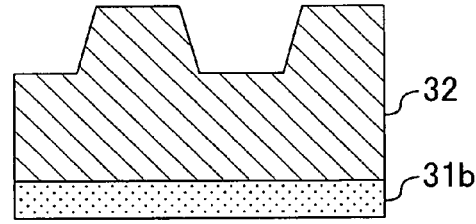
Figure 6D:
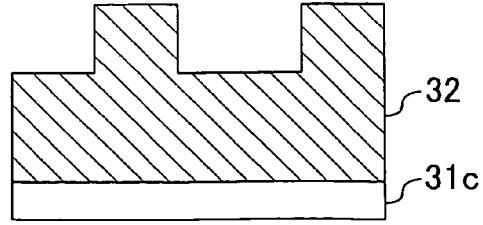
Figure 6G:
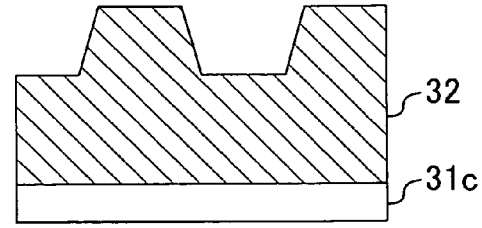
Figure 7A:
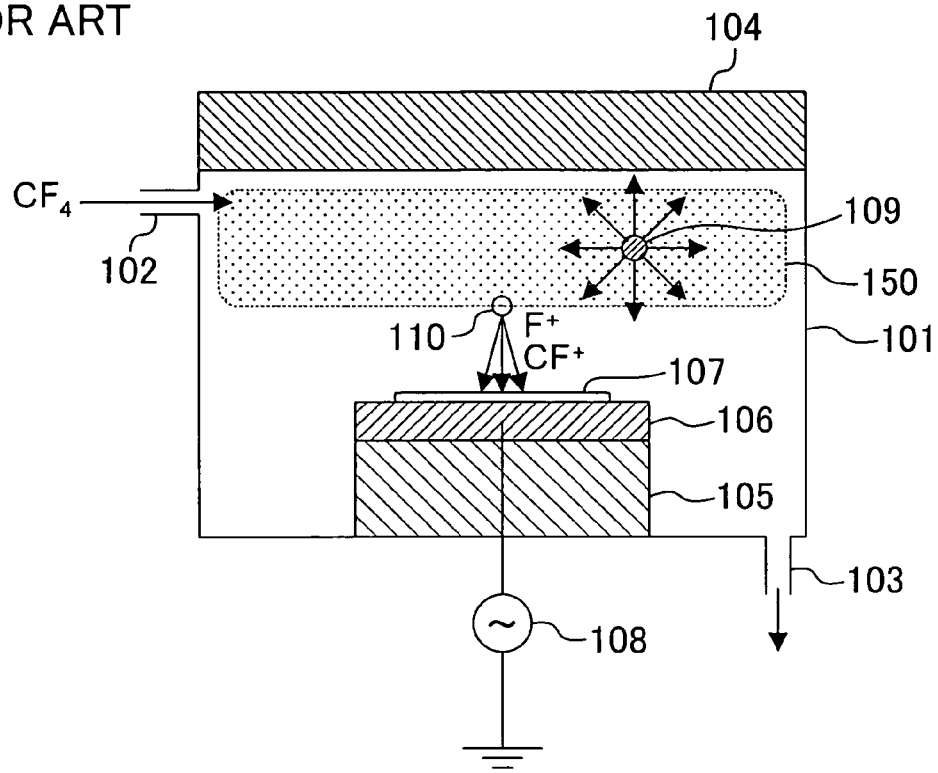
FIGS. 7A and 7B are explanatory diagrams of a conventional dry etching method.
Figure 7B:
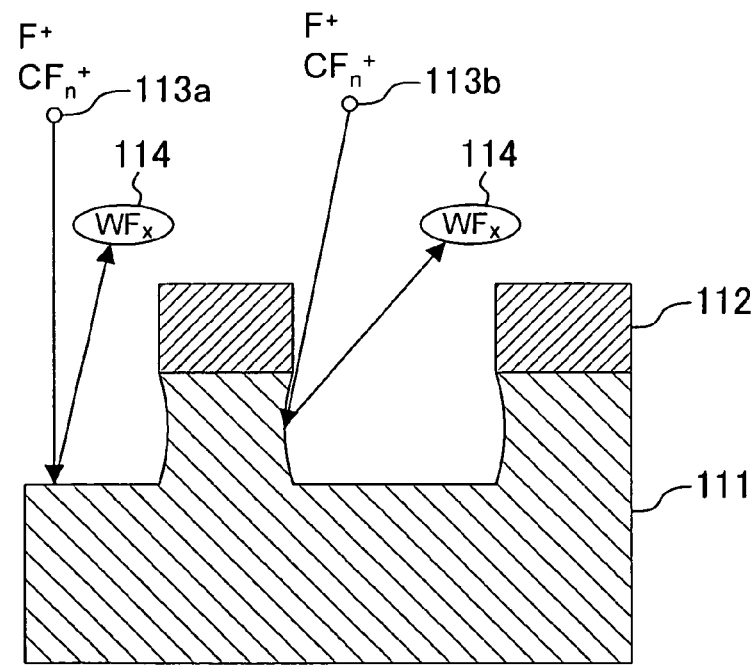
Figure 8A:
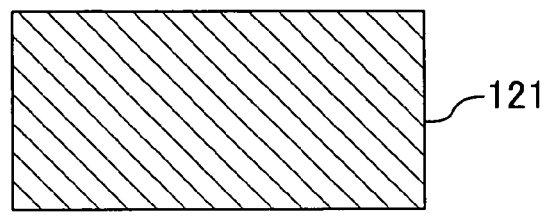
FIGS. 8A, 8B, 8C and 8D are cross-sectional views for showing procedures in a conventional fine structure formation method and a mold fabrication method by employing the same.
Figure 8B:
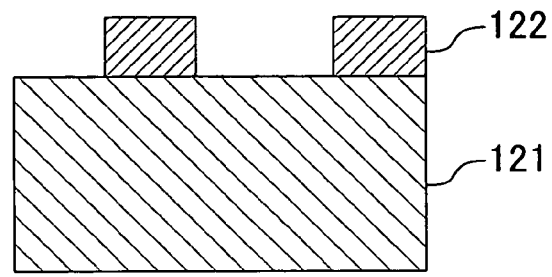
Figure 8C:
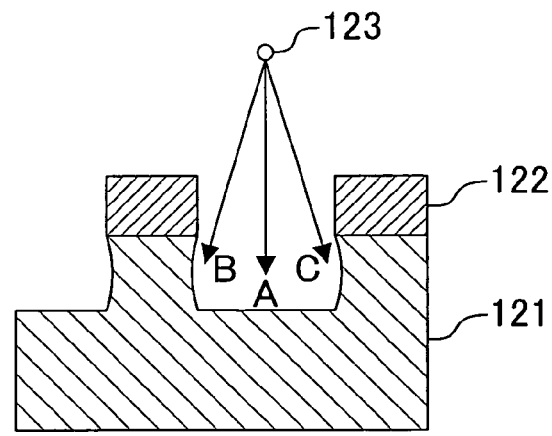
Figure 8D:
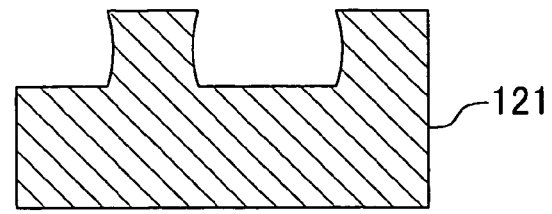

Since the mold of this embodiment is fabricated by dry etching the substance including tungsten and carbon by using plasma generated from a mixed gas at least of a gas including a fluorine atom and a gas including a CN bond and a hydrogen atom, a mold having a fine concavo-convex pattern in a vertical cross-sectional shape free from a bowing shape as shown in FIGS. 6B through 6D or in a downward tapered cross-sectional shape as shown in FIGS. 6E through 6G can be realized.

The underlying substrate 31 of the mold may be a substrate 31a made of a metal or a conducting material (shown in FIG. 6B or 6E), a substrate 31b made of an insulating material (shown in FIG. 6C or 6F) or a substrate 31c made of a semiconductor material (shown in FIG. 6D or 6G), and the material for the substrate is selected in accordance with the use of the mold. For example, in the case where the mold is used with a current allowed to flow therethrough, the substrate 31a is selected as the underlying substrate 31. Alternatively, in the case where the mold is used with electrically insulated, the substrate 31b is selected as the underlying substrate 31.

In this embodiment, the gas including a fluorine atom used for fabricating the mold may be any of a fluorine molecule, fluorocarbon and fluorohydrocarbon or a mixture of two or more of them. For example, a gas of $F_2$, $CF_4$, $C_2F_6$, $C_3F_8$, $C_4F_6$, (cyclic or linear) $C_4F_8$, (cyclic or linear) $C_5F_8$, $CHF_3$, $CH_2F_2$, $CH_3F$ or the like, or a CF gas with a higher molecular weight for ecological use may be used. When such a gas is used, fluorine and a dissociated molecule including fluorine necessary for etching the tungsten (W) included in the substance including W and C is efficiently produced through the plasma discharge. Therefore, the substance including W and C can be more inexpensively etched into a highly precise vertical shape or a highly precise downward tapered shape. As a result, a mold having a fine concavo-convex pattern with highly precise vertical or highly precise downward tapered side faces can be more inexpensively provided.

Furthermore, in this embodiment, any of alkylamine [R—$NH_2$], dialkylamine [$R_2$—NH] and trialkylamine [$R_3$—N] or a mixture of two or more of them is used as the gas including a CN bond and a hydrogen atom used for fabricating the mold. Since these gases have comparatively small molecules, they can be easily dissociated through the plasma, and hence, hydrogen and a $CNH_s$ molecule (wherein s=0, 1, 2, 3, 4 or 5) can be efficiently supplied. In other words, since hydrogen and a $CNH_s$ molecule (wherein s=0, 1, 2, 3, 4 or 5) can be efficiently supplied to the inside of a fine structure (a recess) during the etching, a sidewall protecting film can be efficiently formed, and hence, a mold having a fine structure with a vertical shape or downward tapered shape and a high aspect ratio can be provided.

Moreover, in this embodiment, the mixed gas of the gas including a fluorine atom and the gas including a CN bond and a hydrogen atom may be replaced with a gas including a fluorine atom, a CN bond and a hydrogen atom (such as 1-fluoro-2,4-dinitrobenzene ($C_6H_3F(NO_2)_2$) or 2-fluoro-1,3,5-trinitrobenzene ($C_6H_2F(NO_2)_3$)).

Furthermore, in this embodiment, the mixed gas of the gas including a fluorine atom and the gas including a CN bond and a hydrogen atom may further include a hydrogen molecule. Thus, since the amount of hydrogen produced through the plasma discharge is increased, the etching efficiency for the carbon (C) included in the substance including W and C is increased, so that a mold having a fine concavo-convex pattern with a vertical or tapered downward cross-section can be rapidly provided.

Moreover, in this embodiment, the mixed gas of the gas including a fluorine atom and the gas including a CN bond and a hydrogen atom may further include a gas including an oxygen atom. Thus, since oxygen can be efficiently supplied, the carbon included in the substance including W and C and a deposition such as an excessive portion of the sidewall protecting film can be appropriately removed and the etching rate can be increased. Therefore, a mold having a fine concavo-convex pattern with a vertical or downward tapered cross-section can be further rapidly provided.

Furthermore, in this embodiment, an inert gas may be further mixed with the mixed gas of the gas including a fluorine atom and the gas including a CN bond and a hydrogen atom. When an inert gas is mixed, the plasma discharge can be further stabilized due to the inert gas effect, and hence, what is called a process window (i.e., an applicable range of process conditions) can be easily increased. Accordingly, a mold having a fine concavo-convex pattern with a vertical or downward tapered cross-section can be stably provided.

Moreover, in this embodiment, the mixed gas of the gas including a fluorine atom and the gas including a CN bond and a hydrogen atom preferably further includes a gas including a nitrogen atom. Thus, the power to remove the C included in the substance including W and C is increased, so as to increase the etching rate. It is noted that the gas including a fluorine atom and the gas including a nitrogen atom may be replaced with a gas including a fluorine atom and a nitrogen atom. Also, the gas including a nitrogen atom is preferably a nitrogen molecule, an ammonia molecule or a mixture of them. Since the molecular weight of such a gas is small, a nitrogen atom ion can be efficiently produced. As a result, a mold having a fine concavo-convex pattern with an arbitrary cross-sectional shape ranging from a vertical shape to a downward tapered shape can be inexpensively provided.

Furthermore, in this embodiment, the mixed gas of the gas including a fluorine atom and the gas including a CN bond and a hydrogen atom preferably further includes a gas including a hydrocarbon molecule. Thus, the formation of the sidewall protecting film is accelerated and the effect to protect a resist is increased. The hydrocarbon molecule is preferably a saturated hydrocarbon molecule. Since the saturated hydrocarbon molecule does not include a double bond, it can be easily decomposed through the plasma discharge, and $CH_r$ (wherein r=1 through 3) can be efficiently produced as a decomposition product. Accordingly, the protecting film for the pattern side face can be efficiently formed from the $CH_r$ during the etching. As a result, a mold having a fine concavo-convex pattern with a vertical cross-section or a downward tapered cross-section can be more easily provided.

Alternatively, in this embodiment, the plasma is preferably generated with at least one of a gas including a chlorine atom, a gas including a bromine atom and a gas including an iodine atom further mixed with the mixed gas of the gas including a fluorine atom and the gas including a CN bond and a hydrogen atom. In this manner, the side face protecting function for the etched portion (recess) can be increased by chlorine, bromine or iodine, and hence, a mold having a fine structure with a vertical or downward tapered cross-section and a high aspect ratio can be easily provided.

As described so far, in this embodiment, a mold having a highly precisely processed fine concavo-convex pattern can be inexpensively, easily and stably provided. As the cross-sectional shape of the fine concavo-convex pattern, any shape ranging from a shape vertical to the substrate surface to a downward tapered shape (namely, a shape in which the upper base is longer than the lower base in the cross-section of each recess) can be freely formed in a WC alloy or the like.

Furthermore, the dimensional etching limit of the fine concavo-convex pattern of the mold of this embodiment largely depends upon the lithography technique employed for forming the resist pattern, and currently, the substance can be etched by the minimum dimension of approximately 50 nm. Also, the mold of this embodiment can be used in various applications ranging from fabrication of an optical circuit component with a large processing dimension to nano-imprint where the minimum dimension is pursued. Moreover, since the mold of this embodiment has the etched cross-section in a vertical shape or a downward tapered shape free from a bowing shape, a material onto which the concavo-convex pattern is transferred is not clogged up in recesses of the mold, and the mold can be easily peeled off after the transfer. Furthermore, in order to increase the use durability of the mold of this embodiment by more definitely preventing the clogging of the mold, the fine concavo-convex surface of the mold is subjected to a surface treatment with a metal, Teflon-coating, a silicon coupling agent or the like. The material used in such a surface treatment is arbitrarily selected in accordance with the material onto which the concavo-convex pattern is transferred by using the mold.

Although the substance including tungsten and carbon is used as the material of the surface portion of the mold in this embodiment, the same effects as those of this embodiment can be attained even when the substance further includes nitrogen. In other words, the same effects as those of this embodiment can be attained also when a WCN alloy or a WNC alloy is used.

What is claimed is:

1. A dry etching method of etching using a dry etching system having a reaction chamber with a gas inlet, the method comprising:

dry etching a substance including tungsten and carbon by using plasma generated from a mixed gas of a gas including fluorine and a gas including a carbon-nitrogen bond and hydrogen in the reaction chamber, wherein:

the substance is a substrate or a layer each made of a tungsten-carbon alloy or a material in which a total composition ratio of tungsten and carbon is 50 atomic percent or more, the gas including fluorine and the gas including a carbon-nitrogen bond and hydrogen are supplied from the gas inlet to the reaction chamber, and said gas including a carbon-nitrogen bond and hydrogen includes alkylamine, dialkylamine, trialkylamine or a mixture of two or more thereof.

2. The dry etching method of claim 1, wherein said gas including fluorine includes a fluorine molecule, fluorocarbon, fluorohydrocarbon or a mixture of two or more thereof.

3. The dry etching method of claim 1, wherein said mixed gas further includes a hydrogen molecule.

4. The dry etching method of claim 1, wherein said mixed gas further includes a gas including oxygen.

5. The dry etching method of claim 1, wherein said mixed gas further includes an inert gas.

6. The dry etching method of claim 1, wherein said mixed gas further includes a gas including nitrogen.

7. The dry etching method of claim 6,
wherein said gas including nitrogen includes a nitrogen molecule, an ammonia molecule or a mixture thereof.

8. The dry etching method of claim 1,
wherein said mixed gas further includes a hydrocarbon molecule.

9. The dry etching method of claim 8,
wherein said hydrocarbon molecule is a saturated hydrocarbon molecule consisting of carbon and hydrogen.

10. The dry etching method of claim 1,
wherein said mixed gas further includes at least one of a gas including chlorine, a gas including bromine and a gas including iodine.

11. A method of forming a fine structure by etching using a dry etching system having a reaction chamber with a gas inlet, the method comprising:
forming a mask pattern on a substance including tungsten and carbon; and
with said mask pattern used as an etching mask, dry etching said substance by using plasma generated from a mixed gas of a gas including fluorine and a gas including a carbon-nitrogen bond and hydrogen in the reaction chamber, wherein:
the substance is a substrate or a layer each made of a tungsten-carbon alloy or a material in which a total composition ratio of tungsten and carbon is 50 atomic percent or more,
the gas including fluorine and the gas including a carbon-nitrogen bond and hydrogen are supplied from the gas inlet to the reaction chamber, and
said gas including a carbon-nitrogen bond and hydrogen includes alkylamine, dialkylamine, trialkylamine or a mixture of two or more thereof.

12. The fine structure formation method of claim 11,
wherein said gas including fluorine includes a fluorine molecule, fluorocarbon, fluorohydrocarbon or a mixture of two or more thereof.

13. The fine structure formation method of claim 11,
wherein said mixed gas further includes a hydrogen molecule.

14. The fine structure formation method of claim 11,
wherein said mixed gas further includes a gas including oxygen.

15. The fine structure formation method of claim 11,
wherein said mixed gas further includes an inert gas.

16. The fine structure formation method of claim 11,
wherein said mixed gas further includes a gas including nitrogen.

17. The fine structure formation method of claim 16,
wherein said gas including nitrogen includes a nitrogen molecule, an ammonia molecule or a mixture thereof.

18. The fine structure formation method of claim 11,
wherein said mixed gas further includes a hydrocarbon molecule.

19. The fine structure formation method of claim 18,
wherein said hydrocarbon molecule is a saturated hydrocarbon molecule consisting of carbon and hydrogen.

20. The fine structure formation method of claim 11,
wherein said mixed gas further includes at least one of a gas including chlorine, a gas including bromine and a gas including iodine.

21. A method of fabricating a mold by etching using a dry etching system having a reaction chamber with a gas inlet, the method comprising:
dry etching a substance including tungsten and carbon by using plasma generated from a mixed gas of a gas including fluorine and a gas including a carbon-nitrogen bond and hydrogen in the reaction chamber to process said substrate into a mold, wherein:
the substance is a substrate or a layer each made of a tungsten-carbon alloy or a material in which a total composition ratio of tungsten and carbon is 50 atomic percent or more,
the gas including a fluorine atom and the gas including a carbon-nitrogen bond and a hydrogen atom are supplied from the gas inlet to the reaction chamber, and
said gas including a carbon-nitrogen bond and hydrogen includes alkylamine, dialkylamine, trialkylamine or a mixture of two or more thereof.

22. The mold fabrication method of claim 21,
wherein said gas including fluorine includes a fluorine molecule, fluorocarbon, fluorohydrocarbon or a mixture of two or more thereof.

23. The mold fabrication method of claim 21,
wherein said mixed gas further includes a hydrogen molecule.

24. The mold fabrication method of claim 21,
wherein said mixed gas further includes a gas including oxygen.

25. The mold fabrication method of claim 21,
wherein said mixed gas further includes an inert gas.

26. The mold fabrication method of claim 21,
wherein said mixed gas further includes a gas including nitrogen.

27. The mold fabrication method of claim 26,
wherein said gas including nitrogen includes a nitrogen molecule, an ammonia molecule or a mixture thereof.

28. The mold fabrication method of claim 21,
wherein said mixed gas further includes a hydrocarbon molecule.

29. The mold fabrication method of claim 28,
wherein said hydrocarbon molecule is a saturated hydrocarbon molecule consisting of carbon and hydrogen.

30. The mold fabrication method of claim 21,
wherein said mixed gas further includes at least one of a gas including chlorine, a gas including bromine and a gas including iodine.

31. The dry etching method of claim 1,
wherein a surface and an inside portion of the substance is etched, and
a pattern with a substantially vertical shape or a downward tapered shape free from a bowing shape is formed in the substance.

32. The fine structure formation method of claim 11,
wherein in the step of performing dry etching, a surface and an inside portion of the substance is etched, and
a pattern with a substantially vertical shape or a downward tapered shape free from a bowing shape is formed in the substance.

33. The mold fabrication method of claim 21,
wherein a surface and an inside portion of the substance is etched, and
a pattern with a substantially vertical shape or a downward tapered shape free from a bowing shape is formed in the mold.

* * * * *